(12) United States Patent
Ruth et al.

(10) Patent No.: US 12,060,210 B2
(45) Date of Patent: Aug. 13, 2024

(54) APPARATUS AND METHOD FOR CONTAINER INTERFACE OPERATIONS

(71) Applicant: Motogo, LLC, Austin, TX (US)

(72) Inventors: David Brian Ruth, Austin, TX (US); Yuan-Chang Lo, Austin, TX (US)

(73) Assignee: Motogo, LLC, Austin, TX (US)

( * ) Notice: Subject to any disclaimer, the term of this patent is extended or adjusted under 35 U.S.C. 154(b) by 799 days.

(21) Appl. No.: 16/373,541

(22) Filed: Apr. 2, 2019

(65) Prior Publication Data

US 2019/0300259 A1 Oct. 3, 2019

Related U.S. Application Data

(60) Provisional application No. 62/652,074, filed on Apr. 3, 2018.

(51) Int. Cl.
| | |
|---|---|
| *G06Q 10/08* | (2024.01) |
| *B65D 55/14* | (2006.01) |
| *B65D 79/02* | (2006.01) |
| *G06Q 10/0833* | (2023.01) |

(52) U.S. Cl.
CPC ............. *B65D 79/02* (2013.01); *B65D 55/14* (2013.01); *G06Q 10/0833* (2013.01); *B65D 2203/10* (2013.01); *B65D 2211/00* (2013.01); *B65D 2251/10* (2013.01); *B65D 2255/00* (2013.01)

(58) Field of Classification Search
CPC .... B65D 79/02; B65D 55/14; B65D 2203/10; B65D 2211/00; B65D 2251/10; B65D 2255/00; G06Q 10/0833
See application file for complete search history.

(56) References Cited

U.S. PATENT DOCUMENTS

| | | | |
|---|---|---|---|
| 10,657,486 B1 * | 5/2020 | Wolter | G06Q 10/0833 |
| 2003/0015883 A1 * | 1/2003 | Boys | B60R 9/00 |
| | | | 296/37.1 |
| 2005/0207087 A1 * | 9/2005 | Fisher | G07C 9/0069 |
| | | | 361/160 |
| 2006/0109106 A1 * | 5/2006 | Braun | G06Q 10/08 |
| | | | 340/539.13 |

OTHER PUBLICATIONS

Alp M. Arslan, Niels Agatz, Leo Kroon, Rob Zuidwijk, "Crowdsourced Delivery—A Dynamic Pickup and Delivery Problem with Ad Hoc Drivers," (2018) Transportation Science 53(1):222-235. (Year: 2018).*

* cited by examiner

*Primary Examiner* — Daniel Vetter
*Assistant Examiner* — Christopher Gomez
(74) *Attorney, Agent, or Firm* — Moore Intellectual Property Law, PLLC

(57) ABSTRACT

A transport container is provided. The transport container includes a body having a base, a cover, an opening, and at least one side wall all defining a cavity therebetween. The transport container also includes an electronic controller. The electronic controller is configured to determine a geographic route from a carrier destination location to a destination location based on received carrier transfer information and received transportation information. The electronic controller is also configured to display the carrier transfer information on a user interface when the transport container is located at a carrier initial location. The electronic controller is further configured to deploy the transport container when the transport container is located at the carrier initial location.

16 Claims, 17 Drawing Sheets

APPARATUS AND METHOD FOR CONTAINER INTERFACE OPERATIONS

CROSS-REFERENCE TO RELATED APPLICATION

The present application claims priority from U.S. Provisional Application No. 62/652,074, filed Apr. 3, 2018, entitled "SYSTEM, APPARATUS, AND METHOD FOR AUTONOMOUS CONTAINER INTERFACE HUB," which is incorporated by reference herein in its entirety. The present application claims priority from and is a continuation-in-part application of pending U.S. patent application Ser. No. 17/190,648, entitled "SECURE TRANSPORT CONTAINER," filed Mar. 3, 2021, which claims priority from and is a continuation application of pending U.S. patent application Ser. No. 16/261,804, entitled "SECURE TRANSPORT CONTAINER," filed Jan. 30, 2019, which claims priority from and is a continuation of U.S. patent application Ser. No. 15/680,316, entitled "SECURE TRANSPORT CONTAINER," filed Aug. 18, 2017, issued as U.S. Pat. No. 10,275,966, which claims priority from and is a continuation of U.S. patent application Ser. No. 15/498,012, entitled "SECURE TRANSPORT CONTAINER," filed Apr. 26, 2017, issued as U. S. Patent No. 9, 842,449, which claims priority to U.S. Provisional Application No. 62/459,276, entitled "SECURE TRANSPORT CONTAINER," filed Feb. 15, 2017, and to U.S. Provisional Application No. 62/424,253, entitled "SECURE PARCEL SYSTEM," filed Nov. 18, 2016, all of which are incorporated herein by reference in their entireties.

TECHNICAL FIELD

This disclosure relates generally to transporting items using intelligent transport containers and to communicating information related thereto.

BACKGROUND

In recent years, consumers have been purchasing more products on-line. Items purchased on-line are often delivered directly to consumers at their residence. When a package is delivered and no one is present to receive it, the package is exposed and vulnerable to theft. Further, when the contents of a package arrive damaged, it is often difficult to ascertain how and when the damage occurred. Damage could have occurred during shipping, for example, due to poor handling. Additionally, or alternatively, damage could have occurred after delivery, for example, by someone attempting to steal a package that was left unattended by the recipient's front door.

SUMMARY

This disclosure provides apparatus and methods for container interface (e.g., autonomous container carrier interface) operations and for container rerouting operation of an intelligent transport container.

An apparatus according to the disclosure includes a container having a base, a cover, and an interior, and includes an input device coupled to the container and configured to receive data including one or both of transfer information and transportation information. The apparatus further includes a controller configured to determine, based on the data, geographic route information associated with one or both of a first location and a destination location and configured to communicate with a device located outside of the container to initiate a display that indicates the transfer information at the device in response to a detected condition indicating movement of the container from the first location to a second location.

A method according to the disclosure includes receiving, via an input device at a container having a base, a cover, and an interior, data including one or both of transfer information and transportation information. A controller of the container determines, based on the data, geographic route information associated with one or both of a first location and a destination location. In response to a detected condition indicating movement of the container from the first location to a second location, the controller communicates with a device located outside of the container to initiate a display indicating the transfer information at the device.

The transportation information may include routing information, and the controller may be configured to store information associated with the geographical route and to deploy (e.g., deploy or initiate deployment of) the container from the first location along the geographic route based on the stored information. A device according to the disclosure may store instructions that, when executed, cause a processor to perform any combination of the above operations or steps.

In a first illustrative embodiment, a transport container is provided. The transport container includes a body having a base, a cover, an opening, and at least one side wall all defining a cavity therebetween. The transport container also includes an electronic controller. The electronic controller is configured to determine route information associated with a geographic route from a carrier destination location to a destination location based on one or both of received carrier transfer information and received transportation information. The electronic controller is also configured to display the carrier transfer information on a user interface in response to arrival of the transport container at a carrier initial location. The electronic controller is further configured to determine deployment information associated with movement of the transport container from the carrier initial location at least partially along the geographic route. The electronic controller is configured to, after the transport container has been deployed from an initial location, receive (e.g., from at least one mobile device and via a transceiver coupled to the electronic controller) the carrier transfer information and the transportation information via a rerouting signal, determine the geographic route from the carrier destination location to the destination location based on the received carrier transfer information and the received transportation information, display the carrier transfer information on the user interface when the transport container is located at the carrier initial location, and deploy the transport container when the transport container is located at the carrier initial location. In an example, the carrier transfer information is received from a first electronic device and the transportation information is received from a second electronic device. According to an example in which the transport container is located (e.g., arrives) at the carrier destination location, the electronic controller is configured to deploy the transport container from the carrier destination location along the geographic route toward the destination location. In an example, if the carrier destination location is the same as the destination location, the electronic controller determines that the transport container is located at the destination location. The electronic controller in a further example is configured to determine an estimated arrival time of the transport container at the carrier destination location (e.g., while the transport container is located at the carrier initial location), and wirelessly transmit an indication of the estimated arrival time of the transport container to an electronic device.

In a second illustrative embodiment, a method implemented by an electronic controller of a transport container is provided. The method includes determining, by the electronic controller, a geographic route from a carrier destination location to a destination location based on received carrier transfer information and received transportation information. The method also includes displaying, by the electronic controller, the carrier transfer information on a user interface when the transport container is located at a carrier initial location. The method further includes deploying, by the electronic controller, the transport container when the transport container is located at the carrier initial location.

In a third illustrative embodiment, a transport container is provided. The transport container includes a body having a base, a cover, an opening, and at least one side wall all defining a cavity therebetween. The transport container also includes an electronic controller. The electronic controller is configured to determine a geographic route from an initial location to a destination location based on received transportation information. The electronic controller is also configured to determine that a carrier destination location on the geographic route is a same location as the destination location based on received carrier transfer information and the transportation information. The electronic controller is further configured to display the carrier transfer information on a user interface when the transport container is located at a carrier initial location on the geographic route. In addition, the electronic controller is configured to deploy the transport container when the transport container is located at the carrier initial location. In an example, the transport container comprises a locking bar that is adjustable between a locked state where the locking bar locks the base to one or more anchor points and restricts mobility of the transport container and an unlocked state where the base is not locked to the one or more anchor points. The electronic controller is configured to, if the locking bar is in the locked state at the carrier initial location, determine the geographic route from the carrier destination location to the destination location based on the received carrier transfer information and the received transportation information, display the carrier transfer information on the user interface (e.g., while the transport container is located at the carrier initial location), and deploy the transport container (e.g., from the carrier initial location).

In some examples example, the transport container comprises a cover lock that is adjustable between a locked state and an unlocked state, where in the unlocked state the cover lock is configured to permit the cover of the transport container to move between a closed state and an open state. If the cover lock is in the unlocked state at the carrier initial location, the electronic controller is configured to determine the geographic route from the carrier destination location to the destination location based on the received carrier transfer information and the received transportation information, display the carrier transfer information on the user interface while the transport container is located at the carrier initial location, and deploy the transport container while the transport container is located at the carrier initial location.

The electronic controller in certain examples is configured to validate an authenticity of the carrier transfer information. If the authenticity of the carrier transfer information is validated (e.g., while the transport container is located at the carrier initial location), the electronic controller determines the geographic route from the carrier destination location to the destination location based on the received carrier transfer information and the received transportation information, indicates the carrier transfer information via a user interface (e.g., displays the carrier transfer information on a display screen while the transport container is at the carrier initial location), and deploys the transport container (e.g., from the carrier initial location).

In a fourth illustrative embodiment, a method implemented by an electronic controller of a transport container is provided. The method includes determining, by the electronic controller, a geographic route from an initial location to a destination location based on received transportation information. The method also includes determining, by the electronic controller, that a carrier destination location on the geographic route is a same location as the destination location based on received carrier transfer information and the transportation information. The method further includes displaying, by the electronic controller, the carrier transfer information on a user interface when the transport container is located at a carrier initial location on the geographic route. In addition, the method includes deploying, by the electronic controller, the transport container when the transport container is located at the carrier initial location.

In a fifth illustrative embodiment, a transport container is provided. The transport container includes a body having a base, a cover, an opening, and at least one side wall all defining a cavity therebetween. The transport container also includes an electronic controller. The electronic controller is configured to identify a carrier destination location on a first geographic route based on received carrier transfer information. The electronic controller is also configured to determine a second geographic route between the carrier destination location and a destination location based on received transportation information. The electronic controller is further configured to display the carrier transfer information on a user interface when the transport container is located at a carrier initial location on the first geographic route. In addition, the electronic controller is configured to deploy the transport container from the carrier destination location along the second geographic route when the transport container is located at the carrier destination location. The cover is movable between a closed state covering the opening and an open state. The electronic controller is configured to, if the cover is in the open state, determine the second geographic route based on the received carrier transfer information and the received transportation information, display the carrier transfer information on the user interface while the transport container is located at the carrier initial location, and deploy the transport container while the transport container is located at the carrier initial location.

In a sixth illustrative embodiment, a method implemented by an electronic controller of a transport container is provided. The method includes identifying, by the electronic controller, a carrier destination location on a first geographic route based on received carrier transfer information. The method also includes determining, by the electronic controller, a second geographic route between the carrier destination location and a destination location based on received transportation information. The method further includes displaying, by the electronic controller, the carrier transfer information on a user interface when the transport container is located at a carrier initial location on the first geographic route. In addition, the method includes deploying, by the electronic controller, the transport container from the carrier destination location along the second geographic route when the transport container is located at the carrier destination location.

In a seventh illustrative embodiment, a non-transitory computer-readable medium includes program code, which when executed by a processor, causes a transport container to determine a geographic route from a carrier destination location to a destination location based on received carrier transfer information and received transportation information, display the carrier transfer information on a user interface when the transport container is located at a carrier initial location, and deploy the transport container from the current location along the geographic route.

In an eighth illustrative embodiment, a non-transitory computer-readable medium includes program code, which when executed by a processor, causes a transport container to determine a geographic route from an initial location to a destination location based on received transportation information, determine that a carrier destination location on the geographic route is a same location as the destination location based on received carrier transfer information and the transportation information, display the carrier transfer information on a user interface when the transport container is located at a carrier initial location on the geographic route, and deploy the transport container when the transport container is located at the carrier initial location.

In a ninth illustrative embodiment, a non-transitory computer-readable medium includes program code, which when executed by a processor, causes a transport container to identify a carrier destination location on a first geographic route based on received carrier transfer information, determine a second geographic route between the carrier destination location and a destination location based on received transportation information, display the carrier transfer information on a user interface when the transport container is located at a carrier initial location on the first geographic route, and deploy the transport container from the carrier destination location along the second geographic route when the transport container is located at the carrier destination location.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
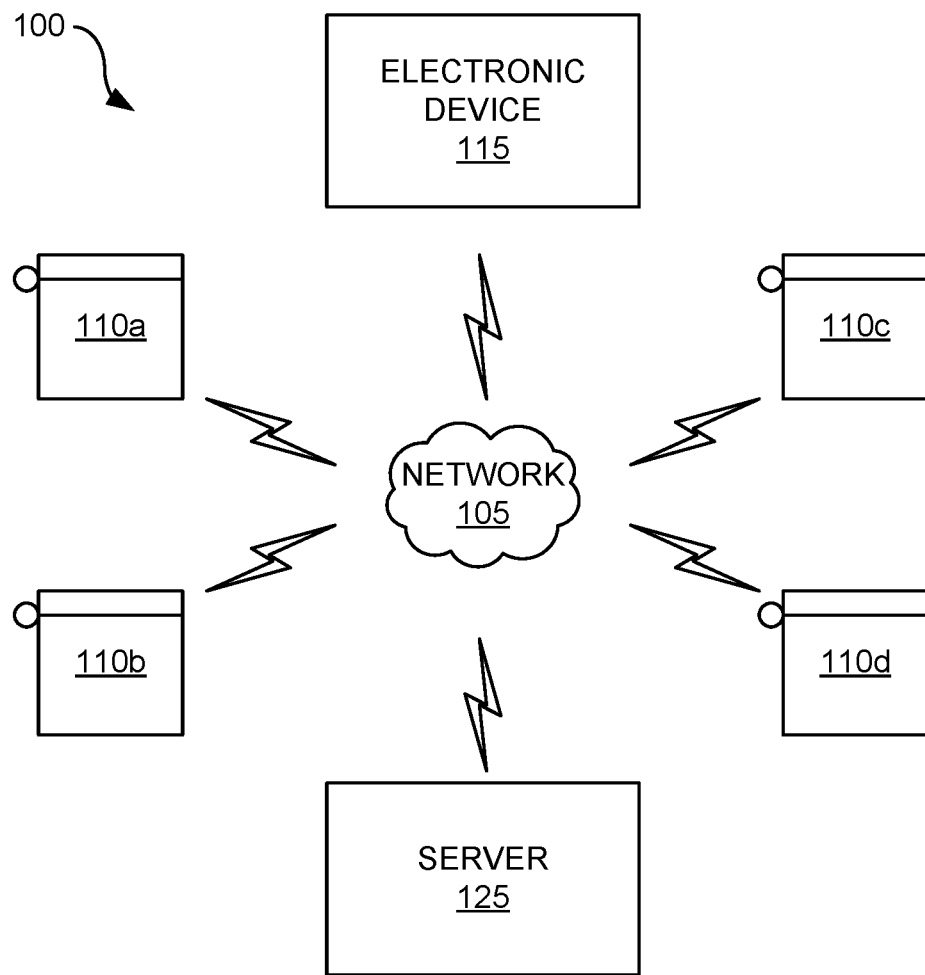
FIG. 1 illustrates a non-limiting, example network context for operating a transport container according to certain embodiments of this disclosure.

FIG. 1 illustrates a non-limiting, example network context 100 for operating a transport container according to certain embodiments of this disclosure. One or more components of the network context 100 may operate as separate components linked by one or more constituent networks of the network 105. In some embodiments, one or more constituent networks of the network 105 may include the internet, which can be accessed over both wired connections (such as at an Ethernet connection provided in, for example, a warehouse, a charging point for a smartbox or a transport container, a staging location for a smartbox, a transport container, or in a delivery vehicle) or over a wireless connection (for example, a wireless local area network "WLAN" connection or a cellular network). Additionally, or alternatively, one or more constituent networks of the network 105 may include a combination of private networks (such as a local wireless mesh network) and public networks (such as a telephone (POTS) network). According to certain embodiments, one or more constituent networks of the network 105 may support multiple communication protocols, including both wireless protocols (for example, BLUETOOTH®, circuit-switched cellular, 3G, LTE or WiBro) and internet protocols (such as HTTP). BLUETOOTH® is a registered trademark of Bluetooth SIG, Inc. of Kirkland, Washington.

In some embodiments, the network context 100 may, according to certain embodiments, include one or more transport containers 110 (such as transport containers 110a, 110b, 110c, and 110d). As discussed herein, the transport containers 110 may generally include a body defining a cavity that is configured to retain packages, parcels, or other items therein for transport. The one or more constituent networks of the network 105 provide two-way connectivity between the transport containers 110. In certain embodiments, the one or more constituent networks of the network 105 provide two-way direct connectivity between two transport containers 110. For example, one or more constituent networks of the network 105 provide connectivity directly between the transport container 110a and the transport container 110b. In certain embodiments, the one or more constituent networks of the network 105 provide two-way indirect connectivity between two transport containers 110.

For example, one or more constituent networks of the network 105 provide connectivity between the transport container 110a and the transport container 110b through the transport container 110c forming a mesh or an ad hoc network.

In certain embodiments, the one or more constituent networks of the network 105 provide two-way connectivity between the transport containers 110 using one or more same or different channels, protocols, or networks of network 105. For example, a circuit-switched cellular protocol wireless network of the network 105 provides connectivity between the transport container 110a and the transport container 110b and a POTS wireless network of the network 105 provides connectivity between the transport container 110a and the transport container 110c.

Additionally, the network context 100 may, according to certain embodiments, include an electronic device 115. In certain embodiments, the electronic device 115 includes a handset or transport container receiving station (e.g., a station having a fixed anchor point for coupling with one or more securing mechanisms of a transport container, as described herein). The one or more constituent networks of the network 105 provide two-way connectivity between the electronic device 115 and the transport containers 110. In certain embodiments, the one or more constituent networks of the network 105 provide two-way direct connectivity between the electronic device 115 and a transport container 110. For example, one or more constituent networks of the network 105 provide connectivity directly between the electronic device 115 and the transport container 110a. In certain embodiments, the one or more constituent networks of the network 105 provide two-way indirect connectivity between the electronic device 115 and a transport container 110. For example, one or more constituent networks of the network 105 provides connectivity between the electronic device 115 and the transport container 110a through the transport container 110c forming a mesh or an ad hoc network. In certain embodiments, the one or more constituent networks of the network 105 provide two-way connectivity between the electronic device 115 and a transport container 110 using one or more same or different channels, protocols, or networks of network 105. For example, a 3G cellular protocol wireless network of network 105 provides connectivity between the electronic device 115 and the transport container 110a, and a ZIGBEE™ network of the network 105 provides connectivity between the electronic device 115 and the transport container 110c. In certain embodiments, mobile devices include transport containers 110 and handsets, as described herein.

Further, the network context 100 may, according to certain embodiments, include a server 125. The one or more constituent networks of the network 105 provide two-way connectivity between the server 125 and the transport containers 110. In certain embodiments, the one or more constituent networks of the network 105 provide two-way direct connectivity between the server 125 and a transport container 110. For example, one or more constituent networks of the network 105 provide connectivity directly between the server 125 and the transport container 110c. In certain embodiments, the one or more constituent networks of the network 105 provide two-way indirect connectivity between the server 125 and a transport container 110. For example, one or more constituent networks of the network 105 provides connectivity between the server 125 and the transport container 110c through the transport container 110a forming a mesh or an ad hoc network. In certain embodiments, one or more constituent networks of the network 105 provide two-way connectivity between the server 125 and a transport container 110 using one or more same or different channels, protocols, or networks of network 105. For example, a BLUETOOTH® wireless network of the network 105 provides connectivity between the server 125 and the transport container 110a, and an LTE network of the network 105 provides connectivity between server 125 and transport container 110c. In certain embodiments, server 125 back-ups information transmitted between transport containers 110 or between electronic device 115 and a transport container 110 using one or more networks of the network 105.

Figure 2:
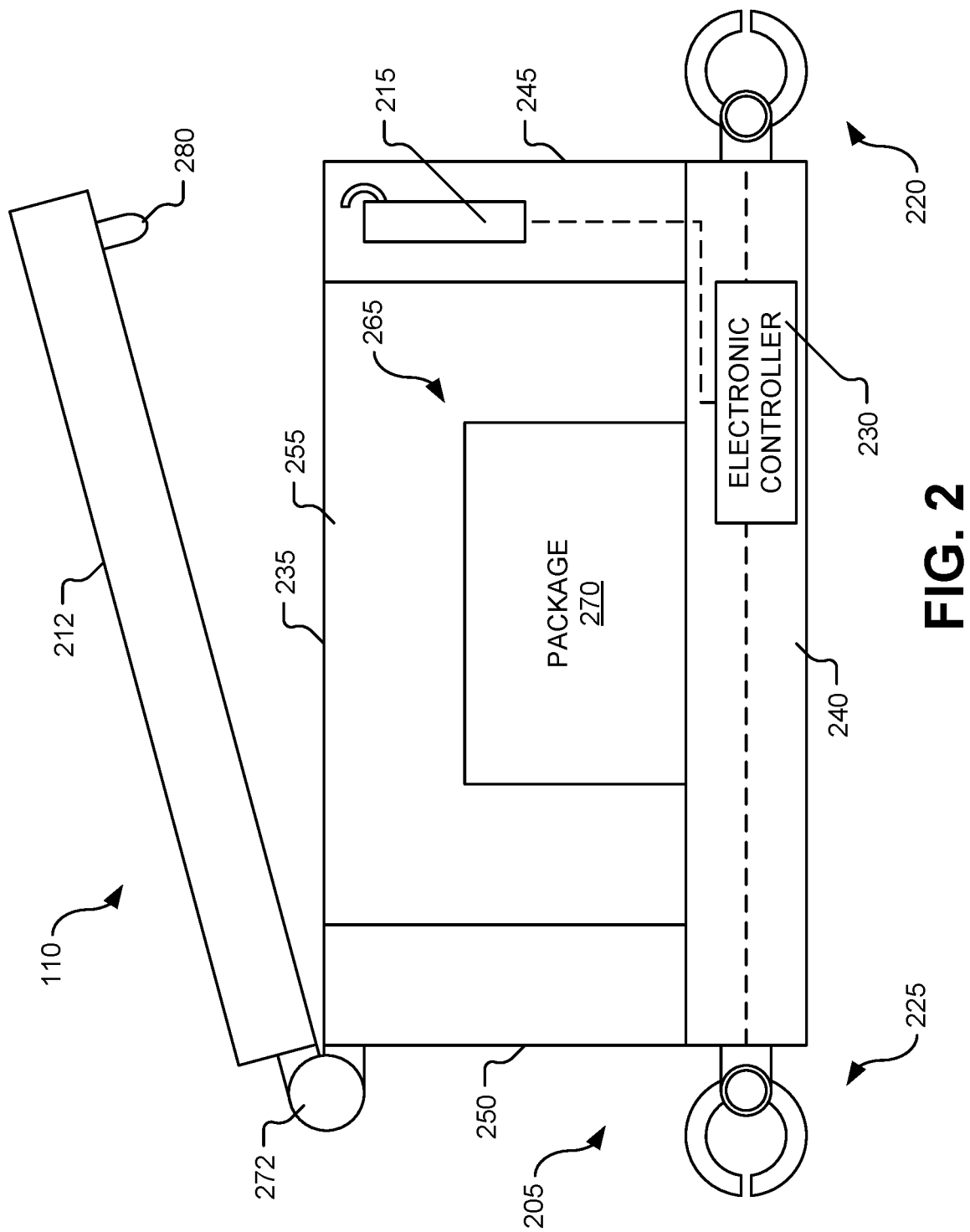
FIG. 2 is a diagram of one exemplary embodiment of a transport container according to certain embodiments of this disclosure.

FIG. 2 is a diagram of one exemplary embodiment of a transport container 110 according to certain embodiments of this disclosure. The transport container 110 illustrated in FIG. 2 includes a body 205, a cover 212, a cover lock 215, a first locking bar 220, a second locking bar 225, and an electronic controller 230. The transport container 110, as described herein, may include fewer, additional, or different components in different configurations than transport container 110 illustrated in FIG. 2. For example, in some embodiments, the transport container 110 includes only one locking bar.

The body 205 is generally box-shaped. The body 205 includes, among other things, an opening 235, a base 240, a front 245, a back 250, a first side 255, and a second side (not shown) opposite the first side 255. The opening 235, the base 240, the front 245, the back 250, the first side 255, and the second side define a cavity 265. The cavity 265 holds one or more packages or items for transport. As an illustrative example, a package 270 is placed within the cavity 265 in FIG. 2. In alternate embodiments, the body 205 has a generally cylindrical shape (not shown) defined by an opening, a base, and at least one side wall defining a cavity therebetween and coverable with a cover. Other configurations of the body 205 are also suitable so long as they define a cavity for placement of packages, parcels, and other items.

In the embodiment illustrated in FIG. 2, the cover 212 is pivotably coupled to the body 205 via one or more hinges 275. In other embodiments, the cover 212 is coupled to the body 205 via other types of connectors (for example, sliding connectors). The cover 212, pivotably coupled to the body 205, allows the cover 212 to transition between an open state and a closed state. In the open state, as illustrated in FIG. 2, the cover 212 is positioned away from the opening 235 such that the cavity 265 is exposed to an ambient environment 231 and contents within the cavity 265 are accessible from the ambient environment 231 through opening 235. In the closed state, the cover 212 is positioned adjacent and over the opening 235 to cover the opening 235 so that the cavity 265 or contents within the cavity 265 are secured and inaccessible from the ambient environment 231 through the opening 235.

The cover lock 215 is configured to transition between an unlocked state, as shown in FIG. 2, and a locked state. When the cover 212 is in the closed state and the cover lock 215 is in the locked state, the cover lock 215 engages a hook 280 included in the cover 212 to prevent the cover 212 from transitioning to the open state. Alternatively, when the cover lock 215 is in the unlocked state, the cover 212 freely moves between the closed state and the open state. The cover lock 215 is electrically coupled to the electronic controller 230. The electronic controller 230 adjusts or transitions the cover lock 215 between the locked state and the unlocked state by generating and sending control signals to the cover lock 215.

Upon being delivered to its destination, the transport container 110 is securely attached to a fixed anchor point via one or more securing mechanisms included in the transport container 110. In certain embodiments, the securing mechanism includes the first locking bar 220 and the second locking bar 225, as illustrated in FIG. 2. In certain embodiments, the fixed anchor point is a bar (not shown). The bar may be attached, for example, to a spot on the ground outside the house of the recipient of the transport container 110. The first locking bar 220 may be securely attached to the bar and thus, securely attaching the transport container 110 to the fixed anchor point. The transport container 110 remains securely attached to the fixed anchor point until the recipient of the transport container 110 retrieves the contents placed within the cavity 265 of the transport container 110. After the contents have been retrieved by the recipient, the transport container 110 can be retrieved by an authorized party (for example, a delivery person of a shipping company or an automated transport vehicle).

The transport container 110 can also be securely attached to anchor points at other locations. For example, the transport container 110 can be securely attached to an anchor point located near the location of the sender of the transport container 110. As another example, the transport container 110 can be securely attached to several different anchor points as it travels from the sender to the recipient (for example, anchors points in delivery vehicles, carrier transfer stations, sorting facilities, or the like).

In some embodiments, the transport container 110 includes a single securing mechanism (e.g., the first locking bar 220). In alternate embodiments, the transport container 110 includes more than one securing mechanism (e.g., the first locking bar 220 and the second locking bar 225). In certain embodiments, the first locking bar 220 is coupled to the front 245 of the transport container 110 and the second locking bar 225 is coupled to the back 250 of the transport container 110. It should be understood that placing locking bars on opposite sides of the transport container 110 enables a secure package transfer transition from a delivery unit to either the next deliver unit or to an anchored delivery point.

The first locking bar 220, the second locking bar 225, and the anchor points, as described herein, are only one exemplary embodiment of a securing mechanism. Locking bars and anchor points can include any appropriate form of complementary locking structures (for example, clamps, hooks, levers, or the like). In addition, in some embodiments, the transport container 110 is securely attached to an anchor point via a magnet lock.

The transport container 110 described herein is described in a same or similar manner as a counterpart transport container described in U.S. Pat. No. 9,842,449, issued Dec. 12, 2017 and U.S. patent application Ser. No. 15/498,012 filed Apr. 26, 2017, each entitled "SECURE TRANSPORT CONTAINER." The content of the above-identified patent documents is incorporated herein by reference in their respective entireties.

Figure 3:
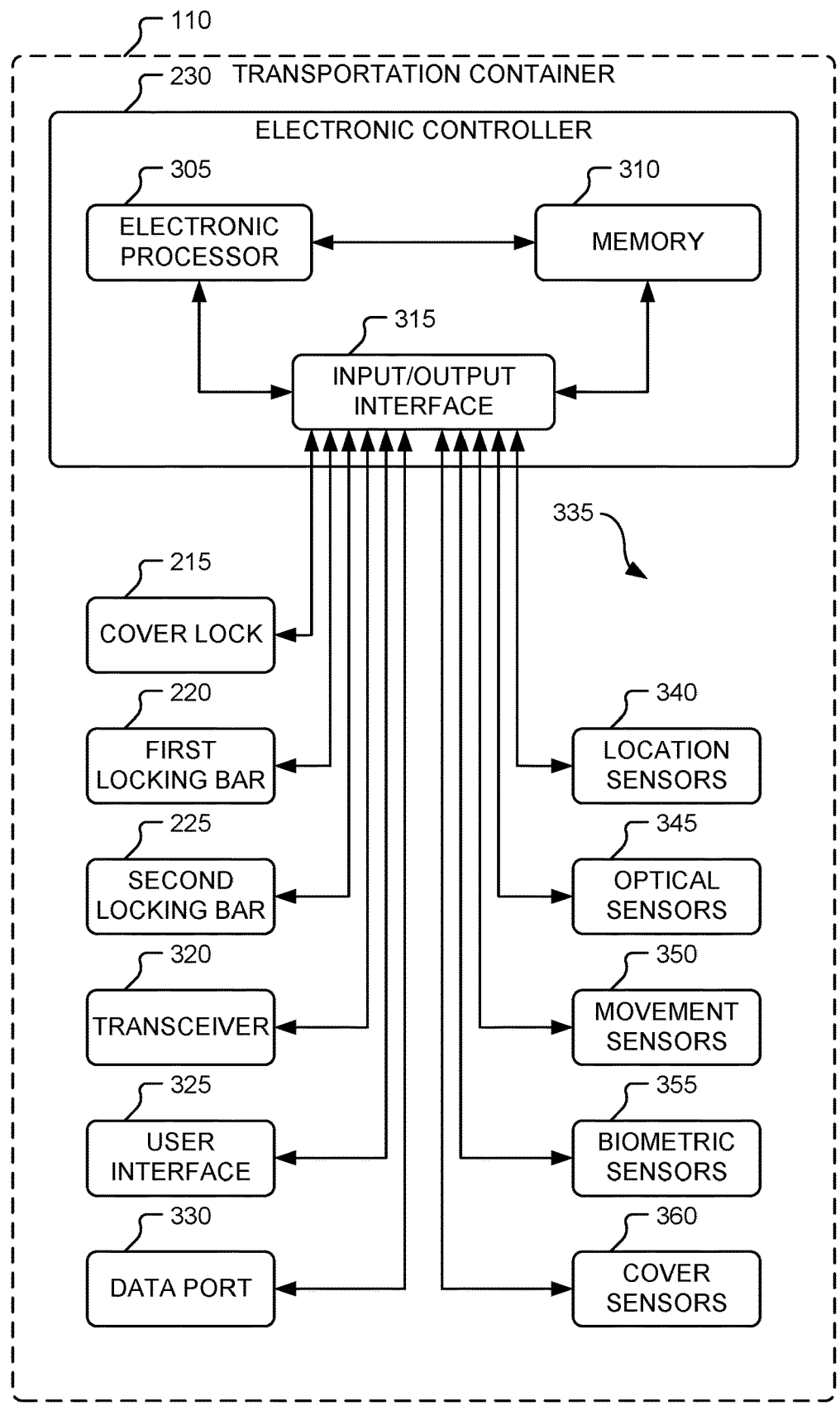
FIG. 3 is a diagram of one exemplary embodiment of the components included in transport container according to certain embodiments of this disclosure.

FIG. 3 is a diagram of one exemplary embodiment of the components included in the transport container 110 according to certain embodiments of this disclosure. In the embodiment illustrated, the transport container 110 includes the cover lock 215, the first locking bar 220, the second locking bar 225, the electronic controller 230, a transceiver 320, a user interface 325, one or more data ports 330, and a plurality of sensors 335.

The electronic controller 230 includes, among other things, an electronic processor 305 (for example, a microprocessor), a memory 310, an input/output interface 315, and a bus. The bus connects various components of the electronic controller 230 including the memory 310 to the electronic processor 305. The memory 310 includes read only memory (ROM), random access memory (RAM), an electrically erasable programmable read-only memory (EEPROM), other non-transitory computer-readable media, a combination thereof, or the like. Details concerning the memory 310 are described herein at least with respect to FIG. 4. The electronic processor 305 is configured to retrieve program instructions and data from the memory 310 and execute, among other things, instructions to perform methods described herein. Additionally or alternatively, the memory 310 is included in the electronic processor 305. The input/output interface 315 includes routines for transferring information between components within the electronic controller 230 and other components that are internal and external to the transport container 110. In certain embodiments, the electronic controller 230 includes processing circuitry for implementing one or more carrier interface operations and transport container rerouting operations, as described herein.

The transceiver 320 is configured to provide communications between the transport container 110 and one or more other transport containers 110 or other components within the network context 100 (e.g., the electronic device 115, the server 125, transport container receiving stations, delivery vehicles, carrier transfer stations, sorting facilities, or the like). The transceiver 320 transmits signals to one or more communication networks and receives signals from the communication networks. In some embodiments, signals include, for example, data, data packets, a combination thereof, or the like. In some embodiments, the transceiver 320 includes separate transmitters and receivers. The communication network may be implemented using various networks, for example, a cellular network, the Internet, a BLUETOOTH® network, a wireless local area network (for example, Wi-Fi), a wireless accessory Personal Area Networks (PAN), cable, an Ethernet network, satellite, a machine-to-machine (M2M) autonomous network, a public switched telephone network, a combination thereof, or the like.

The transceiver 320 may be configured to receive data from one or more components of the network context 100. In certain embodiments, the transceiver is configured to receive data to initiate the electronic controller 230 to perform (e.g., initiate or instigate) one or more carrier interface operations or one or more transport container rerouting operations, as described herein. For example, the transceiver 320 receives an input or command (e.g., an encrypted signal or password) from the electronic device 115 for activating the electronic controller 230 to perform one or more carrier interface operations or one or more transport container rerouting operations, as described herein. As another example, the transceiver 320 receives an input or command from the electronic device 115 for validation, by the electronic controller 230, before the electronic controller 230 activates to perform one or more carrier interface operations or one or more transport container rerouting operations, as described herein.

Additionally, or alternatively, the transceiver is configured to receive data for storage in the memory 310 and for the electronic controller 230 to perform one or more carrier interface operations or one or more transport container rerouting operations, as described herein. The transceiver 320 may be configured to receive geographic information, status information, sensor information, transportation information, carrier transfer information, rerouting information, or the like. For example, the transceiver 320 receives transportation information from an electronic device (e.g., a handset) so that the electronic controller 230 receives information concerning a next package transport. As another example, the transceiver 320 receives carrier transfer information from another transport container 110, an electronic device 115 including an Application Program Interface (API) (e.g., an interface that permits communication between two or more different systems such as a system associated with the transport container 110 and a system associated with another carrier), or a server 125 (e.g., a server associated with the transport container 110 or another carrier) so that the electronic controller 230 performs one or more carrier interface operations or one or more transport container rerouting operations.

As yet another example, the transceiver 320 receives a transport container rerouting signal including rerouting information from another transport container 110, an electronic device 115 including an API, or a server 125 (e.g., a server associated with the transport container 110, a server associated with another carrier) so that the electronic controller 230 performs one or more transport container rerouting operations. As another example, the transceiver 320 receives geographic information (e.g., traffic information, weather information, maps), order data, or container data (e.g., GPS coordinates) from another transport container 110, a handset, or a server 125 (e.g., a server associated with the transport container 110) for use by the electronic controller 230 to perform one or more carrier interface operations or one or more transport container rerouting operations.

As yet another example, the transceiver 320 receives traffic information associated with geographic routes for each delivery order, weather information associated with geographic routes for each delivery order, a plurality of maps for determining one or more geographic routes for each delivery order, transportation route information for one or more vehicles that may carry transport container 110 from an initial location to a destination location, or the like. As another example, the transceiver 320 receives maps indicating one or more locations where carriers can pick up or drop off a transport container 110, maps indicating transportation routes of one or more carriers, or the like.

The transceiver 320 may be configured to transmit data to one or more components of the network context 100. The transceiver 320 may be configured to transmit delivery information, geographic information, status information, sensor information, transportation information, carrier transfer information, rerouting information, or the like to an electronic device 115 (e.g., a handset, a transport vehicle, an electronic device 115 with an API, another transport container 110) or a server 125 (e.g., a server associated with the transport container or a carrier). For example, the transceiver 320 transmits carrier transfer information to the electronic device 115 when the electronic controller 230 has received (e.g., when the electronic controller 230 receives, in response to the electronic controller 230 receiving, a period of time after the electronic controller 230 receives) an input or command or the carrier transfer information. As another example, the transceiver 320 transmits rerouting information to the electronic device 115 when the electronic controller 230 has received an input or command or the rerouting information.

As yet another example, the transceiver 320 transmits delivery information, geographic information, status information, sensor information, transportation information, carrier transfer information, or rerouting information to a server 125 for storage in a memory when the electronic controller 230 has received the delivery information, the geographic information, the status information, the sensor information, the transportation information, the carrier transfer information, or the rerouting information. As another example, the transceiver 320 transmits delivery information, geographic information, status information, sensor information, transportation information, carrier transfer information, or rerouting information to a server 125 for storage in a memory when the transport container 110 is located a particular location (e.g., when the transport container 110 reaches a particular location, in response to the transport container 110 reaching a particular location, a period of time after the transport container 110 reaches a particular location).

As yet another example, the transceiver 320 transmits delivery information, geographic information, status information, sensor information, transportation information, carrier transfer information, or rerouting information to an electronic device 115 for viewing on a user interface when the electronic controller 230 has received (e.g., when the electronic controller 230 receives, in response to the electronic controller 230 receiving, a period of time after the electronic controller 230 receives) the transportation information, the carrier transfer information, or the rerouting information. As another example, the transceiver 320 transmits delivery information, geographic information, status information, sensor information, transportation information, carrier transfer information, or rerouting information to an electronic device 115 for viewing on a user interface when the transport container 110 is located a particular location (e.g., when the transport container 110 reaches a particular location, in response to the transport container 110 reaching a particular location, a period of time after the transport container 110 reaches a particular location).

The user interface 325 is configured to receive and transfer data to the electronic controller 230 or the memory 310. The user interface 325 may receive information through a captured image or through a touch input for processing by the electronic controller 230 or storage in the memory 310. For example, the user interface 325 (e.g., using a camera) captures an image indicative of delivery information, geographic information, status information, sensor information, transportation information, carrier transfer information, or rerouting information and transfers the delivery information, the geographic information, the status information, the sensor information, the transportation information, the carrier transfer information, or the rerouting information to the electronic controller 230 to perform one or more carrier interface operations or one or more transport container rerouting operations, as described herein. As another example, the user interface 325 (e.g., using a keypad or a touch-screen display) receives delivery information, geographic information, status information, sensor information, transportation information, carrier transfer information, or rerouting information and transfers the delivery information, the geographic information, the status information, the sensor information, the transportation information, the carrier transfer information, or the rerouting information to the electronic controller 230 to perform one or more carrier interface operations or one or more transport container rerouting operations, as described herein.

The user interface 325 is configured to display information received by the electronic controller 230 or stored in the memory 310. The user interface 325 may display information on a display screen after information has been received by the electronic controller 230. For example, the user interface 325 displays delivery information, geographic information, status information, sensor information, transportation information, carrier transfer information, or rerouting information when the electronic controller 230 has received the delivery information, the geographic information, the status information, the sensor information, the transportation information, the carrier transfer information, or the rerouting information through the transceiver 320 or through the user interface 325 to perform one or more carrier interface operations or one or more transport container rerouting operations, as described herein. As another example, the user interface 325 displays delivery information, geographic information, status information, sensor information, transportation information, carrier transfer information, or rerouting information when the electronic controller 230 has stored the delivery information, the geographic information, the status information, the sensor information, the transportation information, the carrier transfer information, or the rerouting information in the memory 310.

The user interface 325 may display information on a display screen when the transport container 110 is located a particular location. For example, the user interface 325 displays delivery information, geographic information, status information, sensor information, or transportation information when the transport container 110 is located at an initial location or a carrier destination location. As another example, the user interface 325 displays carrier transfer information when the transport container 110 is located at a carrier initial location or when the transport container 110 is at a location along a geographic route of a carrier. As yet another example, the user interface 325 displays rerouting information when the transport container 110 is located at a location along a geographic route determined by the transport container or when the transport container 110 is at a location along a geographic route of a carrier.

Additionally, or alternatively, the user interface 325 is operably coupled to the electronic controller 230 to control, for example, the states of the cover lock 215, the first locking bar 220, or the second locking bar 225. The electronic controller 230 may receive an unlock code from a user through the user interface 325 and changes the state of the cover lock 215, the first locking bar 220, or the second locking bar 225. For example, the electronic controller 230 changes the cover lock 215 from the locked state to the unlocked state in response to receiving an unlock code from the recipient through the user interface 325. Additionally, or alternatively, the biometric sensor 355 is a component of the user interface 325. The electronic controller 230 may unlock the cover lock 215 in response to performing a biometric validation of biometric data received from the biometric sensor 355. For example, the electronic controller 230 validates a fingerprint obtained by the biometric sensor 355 of the user interface 325.

The user interface 325 can include any combination of digital and analog input devices required to achieve a desired level of control for the transport container 110. For example, the user interface 325 includes a display, a camera, a speaker, a biometric sensor (e.g., a fingerprint sensor), a plurality of knobs, dials, switches, buttons, or the like. In some embodiments, the user interface 325 includes a touch-sensitive interface (e.g., a touch-screen display) that displays visual output generated by software applications executed by the electronic processor 305. Visual output includes, for example, graphical indicators, lights, colors, text, images, graphical user interfaces (GUIs), combinations of the foregoing, or the like. The touch-sensitive interface includes a suitable display mechanism for displaying the visual output (e.g., a light-emitting diode (LED) screen, a liquid crystal display (LCD) screen). The touch-sensitive interface also receives user input using detected physical contact (for example, detected capacitance or resistance). Based on the user input, the touch-sensitive interface outputs signals to the electronic processor 305 which indicate positions on the touch-sensitive interface currently being selected by physical contact.

The data port 330 provides a physical connection for wired communication with the electronic controller 230. In certain embodiments, in addition to or as an alternative to using the transceiver 320, the electronic controller 230 receives and transmits data with the electronic device 115 through the data port 330 and a wired communication line. For example, using the data port 330 and a wired communication line, the electronic controller 230 receives an input or command, delivery information, geographic information, status information, sensor information, transportation information, carrier transfer information, or rerouting information, as described herein.

The plurality of sensors 335 includes various sensors configured to detect various conditions within, around, or otherwise associated with the transport container 110. In some embodiments, the sensors 335 include location sensors 340, optical sensors 345, movement sensors 350, biometric sensors 355, or cover sensors 360. In certain embodiments, the sensors 335 additionally include audio sensors, electrical sensors, maintenance sensors, a combination thereof, or the like.

The location sensors 340 (for example, global positioning system (GPS) sensors) are used to determine an absolute or relative location of the transport container 110. The transport container 110 is secured to an anchoring point upon being delivered. In some embodiments, the electronic controller 230 ensures that the transport container 110 has been delivered to a correct anchoring point (e.g., an initial location or a destination location) by comparing a current location of the transport container 110 (determined using the location sensors 340) to a location of a target anchor point. In some embodiments, the location sensors 340 determine a location of the transport container 110 periodically.

Additionally, or alternatively, the location sensors 340 determine a location of the transport container 110 when the electronic controller 230 has received information (e.g., through the transceiver 320, through the user interface 325) to activate the electronic controller 230 to perform or for the electronic controller 230 to perform one or more carrier interface operations or one or more transport container rerouting operations, as described herein. For example, the electronic controller 230 receives an input or command (e.g., an encrypted signal or password) from the electronic device 115 for activating the electronic controller 230 to perform one or more carrier interface operations or one or more transport container rerouting operations, as described herein. When the electronic controller 230 has received the input or command, the electronic controller 230 transmits a signal to the location sensors 340 to determine a location of the transport container 110 (e.g., a current address, current GPS coordinates, in a storage unit, in transport by a transport vehicle, in transport by a carrier). The electronic controller 230 receives location information indicating a location of the transport container 110 from the location sensors 340 and transmits the location information to an electronic device 115 or a server 125 for storage in a memory or for display on a user interface for viewing. As another example, the electronic controller 230 receives delivery information, geographic information, status information, sensor information, transportation information, carrier transfer information, or rerouting information from the electronic device 115 for performing one or more carrier interface operations or one or more transport container rerouting operations, as described herein. When the electronic controller 230 has received the delivery information, the geographic information, the status information, the sensor information, the transportation information, the carrier transfer information, or the rerouting information, the electronic controller 230 transmits a signal to the location sensors 340 to determine a location of the transport container 110. The electronic controller 230 receives location information indicating a location of the transport container 110 from the location sensors 340 and transmits the location information to an electronic device 115 or a server 125 for storage in a memory or for display on a user interface for viewing.

In certain embodiments, the location sensors 340 periodically detect location parameters indicative of a location of the transport container 110. The electronic controller 230 uses the detected location parameters to determine a location of the transport container 110. For example, the location sensors 340 detect location parameters of the transport container 110 about every minute, about every 2 minutes, about every 5 minutes, about every 10 minutes, about every 30 minutes, about every 60 minutes, about every 12 hours, about once a day, about once a week, about once a month, or the like. The frequency that the location sensors 340 detect location parameters of the transport container 110 may be based on movement of the transport container 110. For example, the electronic controller 230 uses the location sensors 340 to detect location parameters of the transport container 110 more frequently when the transport container 110 is in transit (e.g., being transported in a delivery vehicle) than when the transport container 110 is static (e.g., sitting at a destination location, sitting in a non-mobile storage unit).

The frequency that the location sensors 340 detect location parameters of the transport container 110 may change based on a travel velocity of the transport container 110. For example, the electronic controller 230 instructs the location sensors 340 to increase a frequency that location parameters of the transport container 110 are detected when a travel velocity of the transport container 110 increases. As another example, the electronic controller 230 instructs the location sensors 340 to decrease a frequency that location parameters of the transport container 110 are detected when a travel velocity of the transport container 110 decreases. The frequency that the location sensors 340 detect location parameters of the transport container 110 may change based on a duration of movement of the transport container 110. For example, the electronic controller 230 instructs the location sensors 340 to decrease a frequency of detecting location parameters as the duration that the transport container remains static increases. As another example, the electronic controller 230 instructs the location sensors 340 to increase a frequency of detecting location parameters as the duration that the transport container remains in transit increases.

In certain embodiments, the electronic controller 230 uses the location sensors 340 to guide the transport container 110 along a geographic route, as described herein. In certain embodiments, the location sensors 340 detect location parameters of the transport container 110 when the transport container 110 is at an initial location, a destination location, a carrier transfer location, or a carrier destination location, as described herein. In some embodiments, the location sensors 340 detect location parameters of the transport container 110 when the transport container 110 begins to move from an initial location, a destination location, a carrier transfer location, or a carrier destination location, as described herein.

The optical sensors 345 (e.g., cameras and retinal scanners) are used to capture images for use by the electronic controller 203 of the transport container 110. For example, the optical sensors 345 are used to capture an image of delivery information, geographic information, transportation information, carrier transfer information, or rerouting information for the electronic controller 230 to perform one or more carrier interface operations or one or more transport container rerouting operations, as described herein. As another example, the optical sensors 345 are used to perform a retinal scan. The electronic controller 230 validates an image produced by the retinal scan for access into the cavity 265 to receive delivery information, transportation information, carrier transfer information, or rerouting information through a display screen, or to associate the image produced by the retinal scan with at least some delivery information, transportation information, carrier transfer information, or rerouting information. In some embodiments, the optical sensors 345 are a component of the user interface 325. In other embodiments, the optical sensors 345 are separate components from the user interface 325.

Movement sensors 350 (for example, an accelerometer, gyroscope, or a magnetometer) are used by the electronic controller 230 to detect movement of the transport container 110. The ability to detect movement of the transport container 110 provides a plurality of benefits. For example, while a normal level of movement is to be expected while the transport container 110 is being transported, an excessive amount of movement (for example, movement caused by the transport container 110 being dropped) may indicate mishandling. In some embodiments, the electronic controller 230 uses the movement sensors 350 to detect when the amount of movement is above a set threshold and transmits an alert signal to, for example, the sender, the recipient, the shipping company, or any combination thereof. These alerts signal may be used to determine the cause of damaged packages.

Another benefit of movement sensors 350 is added security. For example, after being secured to an anchoring point the transport container 110 should not be moving until the recipient retrieves the packages. Movement of the transport container 110 after being secured to an anchor point and prior to being retrieved by the recipient could indicate a potential theft attempt. Thus, in some embodiments, the electronic controller 230 detects such improper movement of the transport container 110 and transmits an alert signal to, for example, the sender, the recipient, the shipping company, or any combination thereof.

The biometric sensors 355 (e.g., finger print scans) are used to capture biometric data for use by the electronic controller 203 of the transport container 110. For example, the biometric sensors 355 are used to capture a finger print for validation by the electronic controller 230 to generate for display the delivery information, the geographic information, the status information, the sensor information, the transportation information, the carrier transfer information, or the rerouting information, to associate the finger print with at least some delivery information, transportation information, geographic information, status information, sensor information, carrier transfer information, or rerouting information, or to perform one or more carrier interface operations or one or more transport container rerouting operations, as described herein. In some embodiments, the biometric sensors 355 are a component of the user interface 325. In other embodiments, the biometric sensors 355 are separate components from the user interface 325.

Cover sensors 360 (e.g., pressure sensors, proximity sensors, contact sensors, light sensors) are sensors that detect whether the cover 212 is the open state or the closed state. In certain embodiments, the cover sensors 360 include contact sensors. The contact sensors detect contact between the cover 212 and the body 205. For example, the contact sensors detect whether the cover 212 is in contact with a surface of the body 205 that forms a perimeter around the opening 235. The electronic controller 230 determines that the cover 212 is in the closed state when the contact sensors detect that the cover 212 is in contact with a surface of the body 205 that forms a perimeter around the opening 235. The electronic controller 230 determines that the cover 212 is in the open state when the contact sensors detect that the cover 212 is not in contact with a surface of the body 205 that forms a perimeter around the opening 235.

In certain embodiments, the cover sensors 360 include light sensors. The light sensors detect a presence or an absence of light. For example, the one or more light sensors are positioned on an interior surface of the body 205 that is exposed to the cavity 265, on a surface of the body 205 that forms a perimeter around the opening 235, or on a surface of the cover 212 that is exposed to the cavity 265 when the cover 212 is in the closed state. When the cover 212 is in the closed state, the light sensors detect a relatively low amount of light. The electronic controller 230 determines that the cover 212 is in the closed state when the light sensors measure the relatively low amount of light. When the cover 212 is in the open state, the light sensors detect a relatively high amount of light. The electronic controller 230 determines that the cover 212 is in the open state when the light sensors measure the relatively high amount of light.

Figure 4:
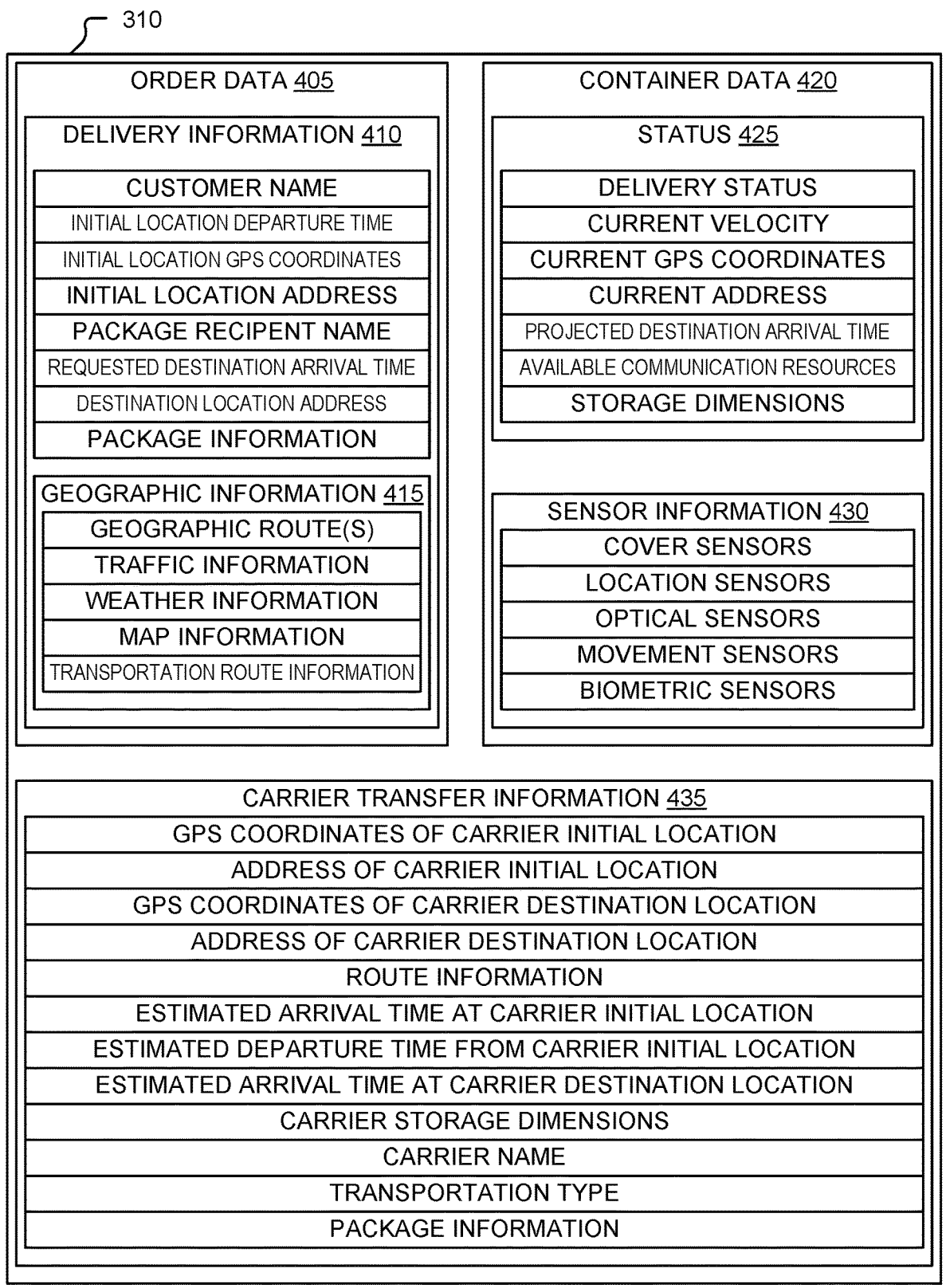
FIG. 4 illustrates data structures for storing data in memory for one or more carrier interface operations or one or more transport container rerouting operations according to certain embodiments of this disclosure.

FIG. 4 illustrates data structures for storing data in the memory 310 for one or more carrier interface operations or one or more transport rerouting operations according to certain embodiments of this disclosure. According to certain embodiments of this disclosure, carrier interface operations are performed by the electronic controller 230 to determine a geographic route from a carrier destination location to a destination location based on received carrier transfer information and received transportation information, display the carrier transfer information on a user interface when the transport container is located at a carrier initial location, and deploy the transport container when the transport container is located at the carrier initial location.

According to certain embodiments of this disclosure, carrier interface operations are performed by the electronic controller 230 to determine a geographic route from an initial location to a destination location based on received transportation information, determine that a carrier destination location on the geographic route is a same location as the destination location based on received carrier transfer information and the transportation information, display the carrier transfer information on a user interface when the transport container is located at a carrier initial location on the geographic route, and deploy the transport container when the transport container is located at the carrier initial location.

According to certain embodiments of this disclosure, carrier interface operations are performed by the electronic controller 230 to identify a carrier destination location on a first geographic route based on received carrier transfer information, determine a second geographic route between the carrier destination location and a destination location based on received transportation information, display the carrier transfer information on a user interface when the transport container is located at a carrier initial location on the first geographic route, and deploy the transport container from the carrier destination location along the second geographic route when the transport container is located at the carrier destination location.

According to some embodiments, shipping the transport containers 110 using multiple carriers can be complicated and a lead to confusing instructions and misrouting of packages. Storing data in one or more data structures of the memory 310 enables the electronic controller 230 to independently determine which carrier is transporting the transport container 110, independently identify an initial location and a destination location for each leg that a carrier is shipping the transport container 110, and independently generate information for display that is relevant to a specific carrier while that specific carrier is shipping the transport container 110 without having to communicate with the server 125.

According to certain embodiments of this disclosure, transport container rerouting operations are performed by the electronic controller 230 to receive carrier transfer information after deploying the transport container 110 from an initial location, determine a second geographic route from a transfer location to a carrier initial location, determine that a carrier destination location is a same location as a destination location based on the carrier transfer information and received transportation information, display the carrier transfer information on a user interface when the transport container is located at the transfer location, deploy the transport container from the transfer location along the second geographic route, and deploy the transport container to the carrier at the carrier initial location.

According to certain embodiments of this disclosure, transport container rerouting operations are performed by the electronic controller 230 to receive carrier transfer information after deploying the transport container 110 from an initial location, determine a second geographic route from a rerouting location to a carrier initial location, determine that a carrier destination location is not a same location as a destination location based on the carrier transfer information and received transportation information, determine a third geographic route from the carrier destination location to the destination location, display the carrier transfer information on a user interface when the transport container is located at the rerouting location, deploy the transport container from the rerouting location along the second geographic route, display the carrier transfer information at the carrier initial location, deploy the transport container to the carrier at the carrier initial location, display the transportation information at the carrier destination location, and deploy the transport container from the carrier destination location along the third geographic route, and reach the destination location.

According to certain embodiments of this disclosure, transport container rerouting operations are performed by the electronic controller 230 to receive transportation information, identify an initial location and a destination location, determine a first geographic route from the initial location to the destination location, receive carrier transfer information, identify a carrier initial location and a carrier final location, determine that the carrier initial location is also the initial location, display the carrier transfer information at the initial location, deploy the transport container to the carrier at the initial location, receive a transport container rerouting signal including rerouting transportation information, identify a rerouting initial location and a rerouting destination location, determine a second geographic route from the rerouting initial location to the rerouting destination location, transmit transport container rerouting signal to the carrier to reroute the transport container 110 to the rerouting initial location, deploy the transport container from the rerouting initial location along the second geographic route, and reach the rerouting destination location.

According to some embodiments, rerouting transport containers 110 can be complicated and a lead to confusing direction and misrouting of packages. Storing data in one or more data structures of the memory 310 enables the transport container 110 to independently determine a new geographic route from an initial location (e.g., a current location) to a new destination location while the transport container 110 is in transit, independently generate for display rerouting information, and independently deploy the transport container 110 from the initial location along the determined new geographic route without having to communicate with the server 125.

FIG. 4 provides several examples 405, 410, 415, 420, and 435 of data structures, which according to certain embodiments, are maintained in the memory 310 of the transport container 110 and in which values of parameters for carrier interface operations and transport container rerouting operations are stored. According to certain embodiments, data structures 405, 410, 415, 420, and 435 may be lists, strings, tables, or dictionaries.

Delivery order data structure 405 includes data pertaining to one or more delivery orders received by the electronic controller 230 of the transport container 110. As shown in FIG. 4, delivery order data structure 405 includes delivery information data substructure 410 and geographic information data substructure 415. Delivery information data substructure 410 includes information related to the one or more delivery orders. For example, delivery information data substructure 410 includes customer names, initial location departure times for each delivery order, initial location GPS coordinates for each delivery order, initial location addresses for each delivery order, package recipient's name for each delivery order, requested destination arrival times for each delivery order, destination location GPS coordinates for each delivery order, destination location addresses for each delivery order, and a package information (e.g., package type, size, dimensions, weight, and any special accommodations for each delivery order). Geographic information data substructure 410 includes geographic and travel information related to one or more delivery orders. For example, geographic information data substructure 410 includes one or more determined geographic routes for each delivery order, traffic information associated with geographic routes for each delivery order, weather information associated with geographic routes for each delivery order, a plurality of maps for determining one or more geographic routes for each delivery order, and transportation route information for one or more vehicles that may carry transport container 110 from the initial location to the destination location.

Container data structure 420 includes data pertaining to the transport container 110. As shown in FIG. 4, container data structure 420 includes container status data substructure 425 and container sensor information data substructure 430. Container status data substructure 425 includes container delivery status information of the transport container 110. For example, delivery information data substructure 410 includes one or more of a delivery status of the transport container 110, a current travel velocity of the transport container 110, current GPS coordinates of the transport container 110, a current closest address of the transport container 110, a projected destination arrival time of the transport container 110, available communication resources of the transport container 110, or storage dimensions of the cavity 265 of the transport container 110. Container sensor information data substructure 430 includes information related to one or more sensors of the transport container 110. For example, container sensor information data substructure 430 includes a status of the cover 212, a status of the cover lock 215, a status of the locking bars 220 and 225, an occupancy status of the cavity 265, a location status, a status identified by one or more optical sensors 345, a movement status identified by one or more movement sensors 350, and a biometric status identified by one or more biometric sensors 355. It should be understood, that information from delivery order data structure 405 and information from container data structure 420 may be displayed on a display screen as a carrier transfer operation or a transport rerouting operation, as described herein.

Carrier transfer information data structure 435 includes data pertaining to information provided by a carrier (e.g., a public/government-operated carrier or a private carrier) or information provided to direct the electronic controller 230 of the transport container 110 to ship the transport container 110 using a carrier. As shown in FIG. 4, carrier transfer information data structure 435 includes GPS coordinates of a carrier initial location, an address of a carrier initial location, GPS coordinates of a carrier destination location, an address of a destination initial location, route information, an estimated arrival time of the transport container at the carrier initial location, an estimated departure time of the transport container 110 from a carrier initial location, an estimated arrival time of the transport container 110 at a carrier destination location, carrier storage dimensions, a carrier's name, a transportation type, or package information.

Turning back to FIG. 3, as described herein, the electronic controller 230 includes processing circuitry for performing one or more carrier interface operations. In certain embodiments, the electronic controller 230, performing one or more carrier interface operations, determines a geographic route from a carrier destination location to a destination location based on received carrier transfer information and received transportation information, displays the carrier transfer information on a user interface when the transport container is located at a carrier initial location, and deploys the transport container when the transport container is located at the carrier initial location.

In certain embodiments, the electronic controller 230, performing one or more carrier interface operations, determines a geographic route from an initial location to a destination location based on received transportation information, determines that a carrier destination location on the geographic route is a same location as the destination location based on received carrier transfer information and the transportation information, displays the carrier transfer information on a user interface when the transport container is located at a carrier initial location on the geographic route, and deploys the transport container when the transport container is located at the carrier initial location.

In certain embodiments, the electronic controller 230, performing one or more carrier interface operations, identifies a carrier destination location on a first geographic route based on received carrier transfer information, determines a second geographic route between the carrier destination location and a destination location based on received transportation information, displays the carrier transfer information on a user interface when the transport container is located at a carrier initial location on the first geographic route, and deploys the transport container from the carrier destination location along the second geographic route when the transport container is located at the carrier destination location.

The electronic controller 230 receives transportation information. Transportation information includes data related to a shipping or delivery order for transporting a package from an initial location to a final or destination location. For example, transportation information includes a customer's or a shipper's name, billing address, and payment information, a number of packages to be delivered, a size, dimensions, and weight of each package to be delivered, an initial location to pick up and begin transport of a package, a requested date and time to pick up and begin transport of a package from an initial location, a destination or final location to deposit and end transport of a package, a requested date and time for reaching a destination or final location to deposit and end transport of a package, one or more special requirements needed for transporting a package, or the like. Transportation information is used by the electronic controller 230 to implement one or more carrier interface operations, as described herein.

In certain embodiments, the electronic controller 230 receives transportation information through the transceiver 320 from another electronic device 115 (e.g., a mobile device or a desktop computer). For example, an electronic controller 230 receives transportation information through the transceiver 320 from a mobile device, such as a handset. A customer may need to transport a package to a destination location using a transport container 110. The customer enters transportation information into an interface (e.g., an electronic application interface for placing a shipping order or a shipping order placement website) displayed on the handset. Using the handset, the customer wirelessly transmits the transportation information directly to the transport container 110 for reception by the electronic controller 230 through the transceiver 320. Each of the respective transceivers 320 receives transportation information using one or more wireless networks, protocols, or channels, as described herein.

The electronic controller 230 identifies an initial location and a destination location using the received transportation information. For example, after the electronic controller 230 receives the transportation information, the electronic controller 230 processes the transportation information to extract, among other things, an initial location and destination location. The electronic controller 230 determines a first geographic route from the initial location to a destination location. For example, the electronic controller 230 may use the data received from the transportation information, one or more maps stored in memory 310, traffic information received through the transceiver 320, and weather information received through the transceiver 320 to determine one or more geographic routes from an initial location to a destination location. Using the maps, the traffic information, and the weather information, the electronic controller 230 may identify the first geographic route among the one or more geographic routes that provides a sufficient amount of time for the transport container 110 to reach the destination location in accordance with the transportation information (e.g., a customer's specified arrival time of the transport container 110 and the destination location).

Additionally, or alternatively, the electronic controller 230 receives transport vehicle schedule information and transport vehicle load information to optimize the transport capacity of one or more transport vehicles. For example, the electronic controller 230 may identify or determine the first geographic route among one or more geographic routes based on optimizing the carrying capacity of one or more transport vehicles while simultaneously remaining in accordance with the transportation information.

The electronic controller 230 receives carrier transfer information. Carrier transfer information is information provided by a carrier. For example, in addition to receiving transportation information, the electronic controller 230 receives carrier transfer information and stores the carrier transfer information in the memory 310. The electronic controller 230 may request carrier transfer information if, for example, the electronic controller 230 determines that the electronic controller 230 in unable to navigate the transport container 110 at least a portion of the geographic route determined by the transportation information or if, for example, the electronic controller 230 receives a request (e.g., from a customer through the transportation information) to use a carrier. Carrier transfer information includes GPS coordinates of a carrier initial location, an address of a carrier initial location, GPS coordinates of a carrier destination location, an address of a destination initial location, route information, an estimated arrival time of the transport container at the carrier initial location, an estimated departure time of the transport container 110 from a carrier initial location, an estimated arrival time of the transport container 110 at a carrier destination location, carrier storage dimensions, a carrier's name, a transportation type, or package information.

In certain embodiment, the electronic controller 230 determines an authenticity of the received carrier transfer information. For example, the electronic controller 230 receives carrier transfer information that includes an authentication code. The electronic controller 230 uses the carrier transfer information to perform one or more carrier interface operations or one or more transport container rerouting operations, as described herein, after the electronic controller validates the authentication code.

The electronic controller 230 determines one or more geographic routes from the initial location to the destination location based on the transportation information or the carrier transfer information. For example, after the electronic controller 230 receives the transportation information and the carrier transfer information, the electronic controller 230 processes the transportation information to extract, among other things, an initial location and a destination location. The electronic controller 230 determines a first geographic route from the initial location to a destination location. The electronic controller 230 also processes the carrier transfer information to extract, among other things, one or more carrier initial locations where a carrier can pick up the transport container 110 for transport by the carrier and one or more carrier destination locations where a carrier can drop off the transport container 110 after the carrier transports the transport container 110 a distance between the initial location and the destination location.

In certain embodiments, the electronic controller 230 determines that the electronic controller 230 does not need to navigate the transport container 110 along the first geographic route based on the carrier transfer information in combination with the transportation information. In this case, the electronic controller 230 determines that a carrier initial location is also the initial location, that a carrier destination location is also the destination location, and that one or more carriers is to transport the transport container 110 an entire distance between the initial location and the destination location. The electronic controller 230 deploys the transport container 110 to the carrier at the initial location and the carrier transports the transport container 110 to the destination location.

In certain embodiments, the electronic controller 230 determines that the electronic controller 230 is to navigate the transport container along the entire first geographic route from the initial location to a destination location based on the carrier transfer information in combination with the transportation information. In this case, the electronic controller 230 determines that a carrier initial location is not the initial location, that a carrier destination location is not the destination location, and that one or more carriers is unable to transport the transport container 110 any distance between the initial location and the destination location. The electronic controller 230 deploys the transport container 110 along the first geographic route and navigates the transport container 110 along the first geographic route until the transport container 110 reaches the destination location.

In certain embodiments, the electronic controller 230 determines one or more geographic routes that are different from the first geographic route in order to deploy the transport container 110 to the carrier or to begin navigating the transport container 110 to the destination location when the transport container 110 is located at a carrier destination location. In this case, the electronic controller 230 determines that a carrier initial location is also the initial location, that a carrier destination location is also the destination location, or that one or more carriers are able to transport the transport container 110 at least some distance between the initial location and the destination location. The electronic controller 230 may determine another geographic route from the initial location to a carrier initial location, from a carrier destination location to another carrier initial location, or from a carrier destination location to the destination location.

In some embodiments, the electronic controller 230 may use the data received from the transportation information, the carrier transfer information, one or more maps stored in memory 310, traffic information received through the transceiver 320, and weather information received through the transceiver 320 to determine one or more geographic routes from an initial location to a destination location. Using the maps, the traffic information, and the weather information, the electronic controller 230 may identify one or more geographic routes that provides a sufficient amount of time for the transport container 110 to reach the destination location in accordance with the transportation information (e.g., a customer's specified arrival time of the transport container 110 and the destination location) and the carrier transfer information. Additionally, or alternatively, the electronic controller 230 receives transport vehicle schedule information and transport vehicle load information to optimize the transport capacity of one or more transport vehicles. For example, the electronic controller 230 may identify or determine one or more geographic routes based on optimizing the carrying capacity of one or more transport vehicles while simultaneously remaining in accordance with the transportation information.

The electronic controller 230 displays or generates for display at least some transportation information on a display screen. In certain embodiments, when an electronic controller 230 receives transportation information, the electronic controller 230 displays at least some transportation information on a display screen of the user interface 325 or transmit at least some transportation information for display on a display screen of an electronic device 115. The displayed transportation information may include the customer's name, an initial location departure time for the delivery order, initial location GPS coordinates for the delivery order, an initial location address for the delivery order, a package recipient's name for the delivery order, a requested destination arrival time for the delivery order, destination location GPS coordinates for the delivery order, a destination location address for the delivery order, a package type, size, dimensions, weight, any special accommodations for the delivery order, one or more determined geographic routes for the delivery order, traffic information associated with the geographic routes for the delivery order, weather information associated with the geographic routes for the delivery order, or transportation route information for one or more vehicles that may carry the transport container 110 from the initial location to the destination location.

In certain embodiments, the electronic controller 230 displays the transportation information before the electronic controller 230 deploys the transport container 110 and navigates the transport container 110 along a geographic route. For example, when the electronic controller 230 determines that a carrier initial location is not the initial location, the electronic controller 230 displays the transportation information at the initial location before the electronic controller 230 deploys the transport container 110 from the initial location along a geographic route. As another example, when the electronic controller 230 determines that a carrier destination location is not the destination location, the electronic controller 230 displays the transportation information at the carrier destination location before the electronic controller 230 deploys the transport container 110 from the carrier destination location along a geographic route. In certain embodiments, the electronic controller 230 displays the transportation information when the transport container 110 reaches the destination location.

In certain embodiments, the electronic controller 230 displays the transportation information through the duration of the transport from the initial location to the destination location. In other embodiments, the electronic controller 230 displays the transportation information for an initial duration of time after receiving the transportation information and when a display of the transportation information is subsequently requested. In yet other embodiments, the electronic controller 230 displays the transportation information when the electronic controller 230 navigates the transport container 110 along a geographic route. The electronic controller 230 displays or generates for display at least some of the transportation information so that a customer can immediately verify that the transportation information is correct and so that a worker involved in transporting the transport container 110 can instantly receive information about the shipping order.

The electronic controller 230 displays or generates for display at least some carrier transfer information on a display screen. In certain embodiments, when an electronic controller 230 receives carrier transfer information, the electronic controller 230 displays at least some carrier transfer information on a display screen of the user interface 325 or transmit at least some carrier transfer information for display on a display screen of an electronic device 115. The displayed carrier transfer information may include GPS coordinates of a carrier initial location, an address of a carrier initial location, GPS coordinates of a carrier destination location, an address of a destination initial location, route information, an estimated arrival time of the transport container at the carrier initial location, an estimated departure time of the transport container 110 from a carrier initial location, an estimated arrival time of the transport container 110 at a carrier destination location, carrier storage dimensions, a carrier's name, a transportation type, or package information.

In certain embodiments, the electronic controller 230 displays the carrier transfer information before the electronic controller 230 deploys the transport container 110 to a carrier. For example, when the electronic controller 230 determines that a carrier initial location is also the initial location, the electronic controller 230 displays the carrier transfer information at the initial location before the electronic controller 230 deploys the transport container 110 from the initial location to the carrier. As another example, when the electronic controller 230 determines that the transport container 110 is to be deployed to a carrier at a carrier initial location, the electronic controller 230 displays the carrier transfer information at the carrier initial location before the electronic controller 230 deploys the transport container 110 from the carrier initial location to the carrier. In certain embodiments, the electronic controller 230 displays the carrier transfer information when the transport container 110 reaches the destination location.

In certain embodiments, the electronic controller 230 displays the carrier transfer information through the duration of the transport of the transport container 110 by a carrier. In other embodiments, the electronic controller 230 displays the transportation information for an initial duration of time after receiving the carrier transfer information and when a display of the carrier transfer information is subsequently requested. The electronic controller 230 displays or generates for display at least some of the carrier transfer information so that a worker involved in transporting the transport container 110 can instantly receive information about the shipping order.

The electronic controller 230 deploys the transport container 110. In certain embodiments, the electronic controller 230 deploys the transport container 110 from a location (e.g., an initial location, a carrier destination location) along a determined geographic route. For example, the electronic controller 230 deploys the transport container 110 from a location along a geographic route by transmitting a signal to a particular transport vehicle to pick-up the transport container 110 to begin movement of the transport container 110 along the geographic route. As another example, the transport container 110 is electronically and physically coupled to a transport vehicle. The electronic controller 230 deploys the transport container 110 from a location along a geographic route by commanding the transport vehicle to begin moving along the geographic route. In some embodiments, the electronic controller 230 deploys the transport container 110 to a carrier by actuating the locking bars 220 and 225 to the open position in response to receiving an authentication code from an electronic device associated with the carrier.

In certain embodiments, the electronic controller 230 deploys the transport container 110 to a carrier. For example, the electronic controller 230 deploys the transport container 110 to a carrier by transmitting a signal to the carrier instructing the carrier to retrieve the transport container 110 at a location (e.g., the initial location, a carrier initial location). In some embodiments, the signal transmitted by the electronic controller 230 to the carrier includes a carrier transfer signal. The carrier transfer signal indicates that the transport container 110 is located at the carrier initial location and indicates that the transport container 110 is in a condition for reception by the carrier. In some embodiments, the signal transmitted by the electronic controller 230 to the carrier includes a carrier transfer command signal. The carrier transfer command signal instructs a carrier receiving station to retrieve the transport container 110 located at the carrier initial location.

In some embodiments, a signal transmitted by the electronic controller 230 includes transport container transfer signal. The transport container transfer signal indicates that the transport container 110 is located at the carrier initial location and that the transport container 110 is in a condition for reception by the carrier. The signal transmitted by the electronic controller 230 and including transport container transfer signal may be transmitted to a server, a transport vehicle, or an electronic device associated with the carrier (e.g., an electronic device of the first carrier implementing an API). The signal may be transmitted through another transport container 110. In some embodiment, the electronic controller 230 transmits a signal that instructs the carrier to retrieve the transport container 110 at a specified location and in accordance with the transportation information. In yet another example, the electronic controller 230 deploys the transport container 110 to a carrier by deploying the transport container 110 to a carrier receiving station associated with the carrier, as described herein.

In certain embodiments, deploying the transport container 110 includes receiving data inputs from one or more sensors of the transport container 110 or actuating one or more actuators of the transport container 110. For example, before deploying the transport container 110, the electronic controller 230 determines, using the cover sensors 360, that the cover 212 of the transport container 110 is closed as part of a process including one or more steps for deploying the transport container 110. As another example, before deploying the transport container 110, the electronic controller 230 actuates the cover lock 215 to the locked position or the locking bars 220 and 225 to the open position as part of a process including one or more steps for deploying the transport container 110. As yet another example, before deploying the transport container 110, the electronic controller 230 verifies that the cover 212 is in the closed position, verifies that the cover lock 215 is in the locked position, or verifies that the locking bars 220 and 225 are in the open position. In certain embodiments, the electronic controller 230 deploys the transport container 110 by actuating the locking bars 220 and 225 to the open position in response to receiving a signal from an electronic device 115.

In certain embodiments, the electronic controller 230 performs one or more carrier interface operations when the electronic controller 230 determines that the cover 212 is in the open state, that the cover lock 215 is in the unlocked state, or that one or more locking bars are in the locked state. For example, when the electronic controller 230 determines that the cover lock 215 is in the unlocked state or that the cover 212 is in the open state, the electronic controller 230 can perform one or more carrier interface operations, as described herein. Conversely, when the electronic controller 230 determines that the cover lock 215 is in the locked state and that the cover 212 is in the closed state, the electronic controller 230 is unable to perform one or more carrier interface operations. This feature allows only those with authorization to access the contents within the cavity 265 to deploy the transportation container 110 from an initial location.

As another example, when the electronic controller 230 determines that either of the locking bars 220 and 225 is in the locked state, the electronic controller 230 can perform one or more carrier interface operations as described herein. Conversely, when the electronic controller 230 determines that both locking bars 220 and 225 are in the unlocked state, the electronic controller 230 is unable to perform one or more carrier interface operations. This feature prevents unauthorized individuals rerouting the transportation container 110 to another location while the transport container is moving from the initial location.

The electronic controller 230 is configured to receive a rerouting signal. A rerouting signal may include a rerouting authentication code and rerouting information. The rerouting authentication code informs the electronic controller 230 that the transport container rerouting signal is authorized to reroute the transport container 110. The transport container rerouting signal may be received by the electronic controller 230 from the electronic device 115 (e.g., an electronic device 115 implementing an API), a server 125 (e.g., a server associated with the transport container 110 or a server associated with a carrier), or another transport container 110. The rerouting information includes one or more of transportation information or carrier transfer information.

In certain embodiments, the electronic controller 230 receives the rerouting signal after the electronic controller 230 has deployed the transport container from the initial location. For example, after the electronic controller 230 has deployed the transport container 110 from an initial location, the electronic controller 230 receives a rerouting signal. The electronic controller 230 authenticates the rerouting authentication code and determines that the rerouting information includes rerouting transportation information identifying a new destination location. The electronic controller 230 determines a new geographic route from the current location of the transport container 110 or a future location along the current geographic route (e.g., the geographic route that the transport container 110 is currently moving along) to the new destination location. The electronic controller 230 displays or generates for display the rerouting transportation information after receiving the rerouting transportation information and deploys the transport container 110 along the new geographic route.

As another example, after the electronic controller 230 has deployed the transport container 110 from an initial location, the electronic controller 230 receives a rerouting signal. The electronic controller 230 authenticates the rerouting authentication code and determines that the rerouting information includes rerouting carrier transfer information identifying a new carrier initial location and a new carrier destination. The electronic controller 230 determines a new geographic route from the current location of the transport container 110 or a future location along the current geographic route (e.g., the geographic route that the transport container 110 is currently moving along) to the new carrier initial location. The electronic controller 230 also determines another new geographic route from the new carrier destination location to the destination location when the new carrier destination location is not the destination location. The electronic controller 230 displays or generates for display the rerouting carrier transfer information after receiving the rerouting carrier transfer information or when the transport container 110 is located at the new carrier initial location and deploys the transport container 110 to the carrier at the new carrier initial location.

In certain embodiments, the electronic controller 230 receives the rerouting signal after the electronic controller 230 has deployed the transport container 110 to a carrier. For example, after the electronic controller 230 has deployed the transport container 110 to a carrier and the electronic controller 230 has received a rerouting signal, the electronic controller 230 authenticates the rerouting authentication code and determines that the rerouting information includes rerouting transportation information identifying a rerouting destination location (e.g., a new destination location). When the carrier destination location is also the destination location, the electronic controller 230 transmits the rerouting signal to the carrier (e.g., a server associated with the carrier or an electronic device associated with the carrier) requesting that the carrier reroute the transport container 110 to the rerouting destination location or to a carrier destination location that is as close as possible to the rerouting destination location. When the carrier destination location is not the destination location or when the carrier is only able to transport the transport container 110 to a carrier destination location that is not the rerouting destination location, the electronic controller 230 determines a new geographic route from the carrier destination location to the rerouting destination location. The electronic controller 230 displays or generates for display the rerouting transportation information after receiving the rerouting transportation information and, when necessary, deploys the transport container 110 along the new geographic route from the carrier initial location.

Figure 5A:
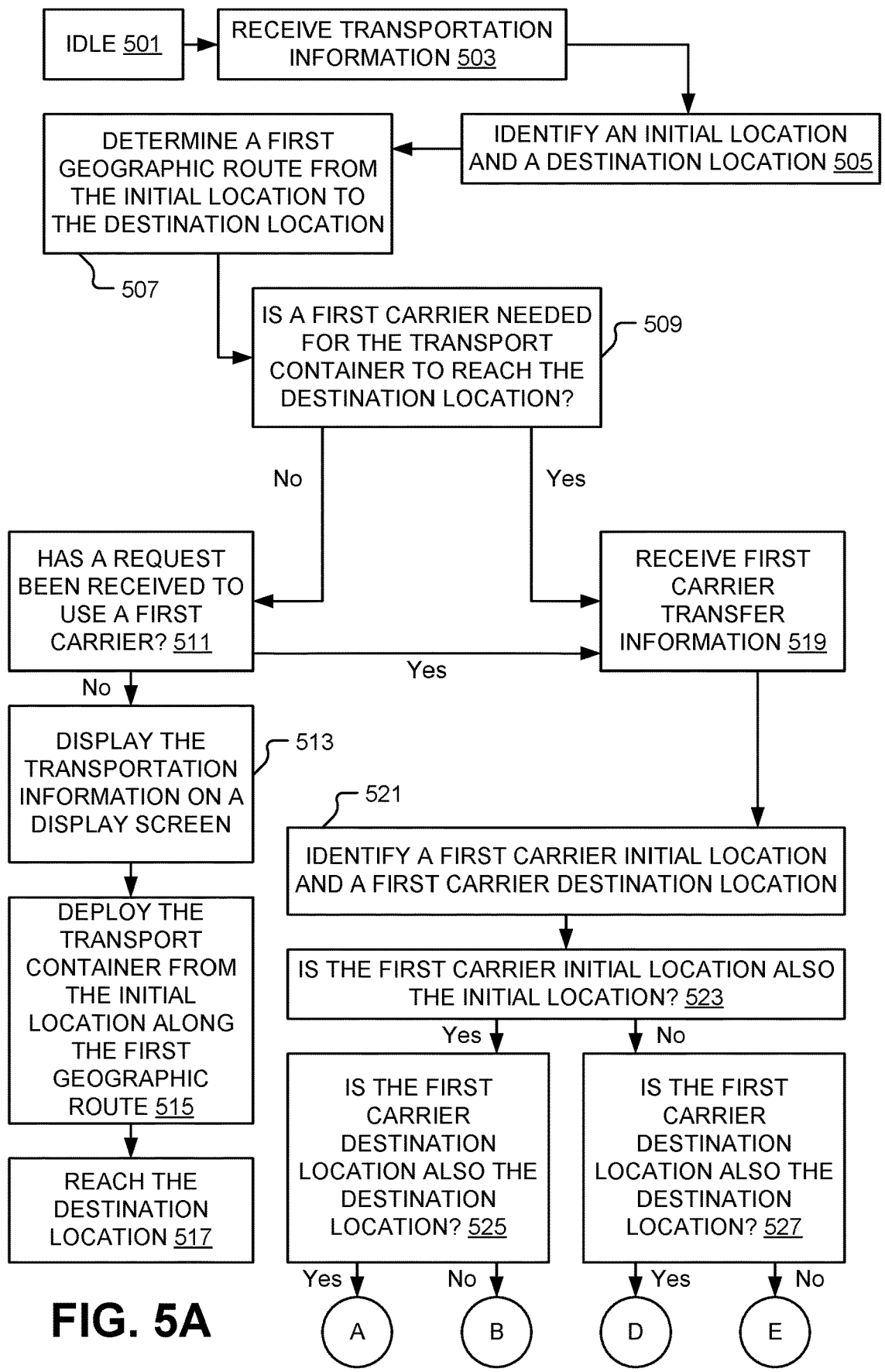
FIGS. 5A, 5B, 5C, 5D, 5E, and 5F illustrate a method implemented by an electronic controller of a transport container for performing carrier interface operations according to certain embodiments of this disclosure.

FIGS. 5A, 5B, 5C, 5D, 5E, and 5F illustrate a method 500 implemented by an electronic controller 230 of a transport container 110 for performing carrier interface operations according to certain embodiments of this disclosure. Although certain details are provided with reference to the method 500 of FIGS. 5A through 5F, it should be understood that other embodiments may include more, less, or different method steps. In FIG. 5A, the method 500 includes, at step 501, that the electronic controller 230 of the transport container 110 is in an idle state at least with respect to performing carrier interface operations. At step 503, the electronic controller 230 receives transportation information. As discussed herein, transportation information includes a customer's or a shipper's name, billing address, and payment information, a number of packages to be delivered, a size, dimensions, and weight of each package to be delivered, an initial location to pick up and begin transport of a package, a requested date and time to pick up and begin transport of a package from an initial location, a destination or final location to deposit and end transport of a package, a requested date and time for reaching a destination or final location to deposit and end transport of a package, one or more special requirements needed for transporting a package, or the like.

At step 505, the electronic controller 230 identifies an initial location and a destination location based on the received transportation information. At step 507, the electronic controller 230 determines a first geographic route from the initial location to the destination location based on the received transportation information. For example, the electronic controller 230 uses the data received from the transportation information including an initial location to pick up and begin transport of the package and the destination location to deposit the package and end delivery of the package and accesses data stored in the memory 310 to identify the transport container's current location, map information that includes the transport container's current location, the initial location to pick up and begin transport of the package, and the destination location to deposit the package and end delivery of the package. In some embodiments, the electronic controller 230 may also access data stored in the memory 310 that includes traffic information, weather information, transportation route information of one or more vehicles that carry transport containers between locations, or the like. Using the received transportation information and the information stored in the memory 310, the electronic controller 230 determines one or more geographic routes from an initial location (e.g., the current location of the transport container 110, a future location of the transport container 110, or the location where the transport container 110 picks up the package for transport) to the destination location.

At step 509, the electronic controller 230 determines whether a first carrier is needed for the transport container 110 to reach the destination location from the initial location within the parameters provided by the transportation information (e.g., a specified time that the transport container 110 is to reach the destination location). For example, the electronic controller 230 determines that no matter which route of the one or more geographic routes that the electronic controller 230 selects for the first geographic route, the electronic controller 230 is unable to navigate the transport container 110 from the initial location to the destination location under the direction of the transportation information without assistance from a first carrier. The electronic controller 230 may determine that, without a first carrier, the transport container 110 will not reach the destination location at a customer specified time. Additionally, or alternatively, the electronic controller 230 may determine that the electronic controller 230 is unable to navigate particular segments of the first geographic route and thus, requires the assistance of a first carrier.

If the electronic controller 230 determines that the transport container 110 does not require a first carrier to reach the destination location, then at step 511, the electronic controller 230 determines whether a request to use a first carrier has been received. For example, a customer may want to use a particular private carrier to transport the transport container 110 at least some distance between the initial location and the destination location. In certain embodiments, the request for a carrier is included in the transportation information. The electronic controller 230 may determine whether a request for the first carrier has been received based on the received transportation information includes a request to use a first carrier.

If the electronic controller 230 has not received a request to use a first carrier then, at step 513, the electronic controller 230 generates at least some of the transportation information for display on a display screen at the initial location. The displayed transportation information may include the customer's name, an initial location departure time for the delivery order, initial location GPS coordinates for the delivery order, an initial location address for the delivery order, a package recipient's name for the delivery order, a requested destination arrival time for the delivery order, destination location GPS coordinates for the delivery order, a destination location address for the delivery order, a package type, size, dimensions, weight, any special accommodations for the delivery order, one or more determined geographic routes for the delivery order, traffic information associated with the geographic routes for the delivery order, weather information associated with the geographic routes for the delivery order, or transportation route information for one or more vehicles that may carry the transport container 110 from the initial location to the destination location.

At step 515, the electronic controller 230 deploys the transport container 110 from the initial location along the first geographic route. For example, the electronic controller 230 deploys the transport container 110 from the initial location along the first geographic route by transmitting a signal to a particular transport vehicle to pick-up the transport container 110 to begin movement of the transport container 110 along the first geographic route. As another example, the transport container 110 is electronically and physically coupled to a transport vehicle. The electronic controller 230 deploys the transport container 110 from the initial location along the first geographic route by commanding the transport vehicle to begin moving along the first geographic route.

At step 517, the electronic controller 230 guides the transport container 110 along the first geographic route until the transport container 110 reaches the destination location. When the transport container 110 reaches the destination location, the electronic controller 230 may lock one or more locking bars (e.g., locking bars 220 and 225) and engage the transport container 110 with one or more anchor points. Additionally, or alternatively, when the transport container 110 reaches the destination location, the electronic controller may unlock the cover lock 215 and transition the cover 212 from the closed state to the open state so that a package can be retrieved from the cavity 265. In some embodiments, the electronic controller 230 transmits a signal to the electronic device 115 or the server 125 to display an indication that the transport container 110 is located at the destination location.

If the electronic controller 230 determines that the transport container 110 does require a first carrier to reach the destination location or if the electronic controller 230 determines that a request for a first carrier has been received, then at step 519, the electronic controller 230 receives first carrier transfer information. In certain embodiments, the electronic controller 230 sends a request to a first carrier to receive first carrier transfer information. For example, upon determining that the electronic controller 230 is unable to navigate the transport container 110 at least some of the distance between the initial location and the destination location, such as at step 509, the electronic controller 230 sends a request to a first carrier for assistance to transport the transport container 110. The request may include the transportation information, one or more geographic routes including the first geographic route, and one or more segments of the geographic routes where assistance by the first carrier is needed so that the first carrier can sufficiently assist with the transport of the transport container 110. In certain embodiments, the request includes the specified time of delivery (e.g., a time when a customer has requested that the transport container 110 reach the destination location) so that the first carrier can sufficiently accommodate the customer's specified delivery time. In response to transmitting the request, the electronic controller 230 receives first carrier transfer information from the first carrier (e.g., a server associated with the first carrier or an electronic device associated with the first carrier) identifying a first carrier initial location where the electronic controller 230 is to deploy the transport container 110 to the first carrier and a first carrier destination location where either the transport container 110 reaches the destination location or where the electronic controller 230 reestablishes autonomous navigation of the transport container 110.

In certain embodiments, the first carrier transfer information is stored in the memory 310 of the electronic controller 230. For example, the first carrier transfer information is transmitted to the electronic controller 230 when a request to use the first carrier, such as at step 511, is received. Upon determining, by the electronic controller 230, that the request to use the first carrier has been received, the electronic controller 230 accesses the memory 310 to retrieve first carrier transfer information. In some embodiments, the first carrier transfer information may include one or more first carrier initial locations, one or more first carrier destination locations, estimated transport times between each of the one or more first carrier initial locations and each of the one or more first carrier destination locations. The electronic controller 230, in combination with the determined one or more geographic routes including the first geographic route, the traffic information, the weather information, and the transportation information, may use the first carrier transfer information to determine an optimal first carrier initial location and an optimal first carrier destination location satisfying the customer specified order as well as the parameters of the first carrier. In response to determining the optimal first carrier initial location and the optimal first carrier destination location, the electronic controller 230 notifies the first carrier of these determined locations.

At step 521, the electronic controller 230 identifies a first carrier initial location and a first carrier destination location. As discussed herein, the first carrier initial location and the first carrier destination location are identified in the first carrier transfer information. In certain embodiments, the first carrier initial location is also the initial location identified in the transportation information. Additionally, or alternatively, the first carrier destination location is also the destination location identified in the transportation information.

At step 523, the electronic controller 230 determines whether the first carrier initial location is also the initial location. For example, after the electronic controller 230 has received the transportation information and the first carrier transfer information, the electronic controller 230 compares the GPS coordinates or the addresses of both the initial location and the first carrier initial location to determine whether the first carrier initial location is also the initial location. The electronic controller 230 determines whether the first carrier initial location is also initial location in order to determine whether the electronic controller 230 is to autonomously deploy the transport container 110 along a determined geographic route from the initial location or whether the electronic controller 230 is to deploy the transport container 110 to the first carrier when the transport container 110 is at location the initial location.

If the electronic controller 230 determines that the first carrier initial location is also the initial location then, at step 525, the electronic controller 230 determines whether the first carrier destination location is also the destination location. For example, after the electronic controller 230 has received the transportation information and the first carrier transfer information, the electronic controller 230 compares the GPS coordinates or the addresses of both the first carrier destination location and the destination location to determine whether first carrier destination location is also the destination location. The electronic controller 230 determines whether the first carrier destination location is also the destination location in order to determine whether the electronic controller 230 is to autonomously deploy the transport container 110 along a determined geographic route to the destination location or whether the electronic controller 230 is to deploy the transport container 110 to the first carrier in order for the transport container 110 to reach the destination location.

Figure 5B:
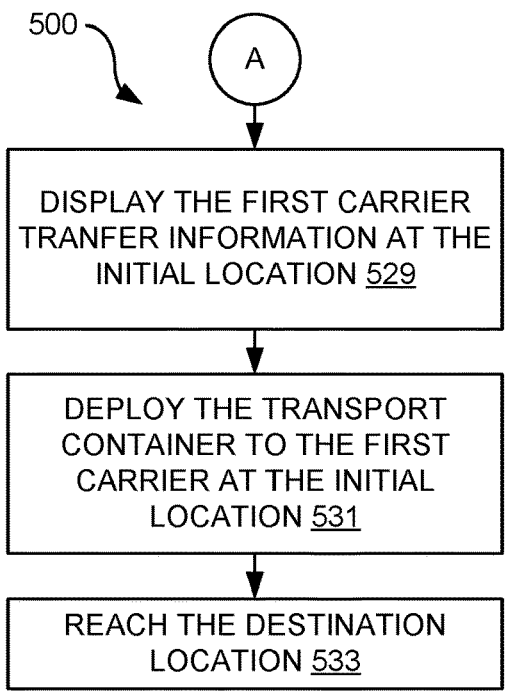

Turning to FIG. 5B, if the electronic controller 230 determines that the first carrier destination location is also the destination location then, at step 529, the electronic controller 230 generates for display the first carrier transfer information when the transport container 110 is at the initial location. For example, after receiving the transportation information and the first carrier transfer information, the electronic controller 230 determines that the electronic controller 230 is to deploy the transport container 110 to the first carrier when the transport container 110 is at the initial location. While the transport container 110 is at the initial location, the electronic controller 230 generates for display the first carrier transfer information so that a worker or a transport vehicle associated with the first carrier can identify that the transport container 110 is to be transported by the first carrier. In certain embodiments, the first carrier transfer information is displayed on a display screen of the transport container 110. Additionally, or alternatively, the first carrier transfer information is displayed on an electronic device associated with the first carrier (e.g., a handset implementing an API or stationary computer terminal implementing an API).

At step 531, the electronic controller 230 deploys the transport container 110 to the first carrier when the transport container 110 is at the initial location. In certain embodiments, deploying the transport container 110 to the first carrier includes transmitting a signal to the first carrier instructing the first carrier to retrieve the transport container 110 at the initial location. For example, after the electronic controller 230 determines that the first carrier initial location is also the initial location or after the electronic controller 230 determines that the first carrier destination location is also the destination location, the electronic controller 230 deploys the transport container 110 to the first carrier by transmitting a signal to a server, a transport vehicle, or an electronic device of the first carrier (e.g., an electronic device of the first carrier implementing an API) instructing the first carrier to retrieve the transport container 110 at the initial location and in accordance with the transportation information.

In certain embodiments, deploying the transport container 110 to the first carrier includes receiving data inputs from one or more sensors of the transport container 110 or actuating one or more actuators of the transport container 110. For example, after the electronic controller 230 determines that the first carrier initial location is also the initial location or after the electronic controller 230 determines that the first carrier destination location is also the destination location, the electronic controller 230 determines, using the cover sensors 360, that the cover 212 of the transport container 110 is closed as part of a process including one or more steps for deploying the transport container 110. As another example, after the electronic controller 230 determines that the first carrier initial location is also the initial location or after the electronic controller 230 determines that the first carrier destination location is also the destination location, the electronic controller 230 actuates the cover lock 215 to the locked position or the locking bars 220 and 225 to the open position as part of a process including one or more steps for deploying the transport container 110. As yet another example, after the electronic controller 230 determines that the first carrier initial location is also the initial location or after the electronic controller 230 determines that the first carrier destination location is also the destination location, electronic controller 230 verifies that the cover 212 is in the closed position, verifies that the cover lock 215 is in the locked position, or verifies that the locking bars 220 and 225 are in the open position. In certain embodiments, the electronic controller 230 deploys the transport container 110 to the first carrier by actuating the locking bars 220 and 225 to the open position in response to receiving an authentication code from an electronic device of the first carrier.

At step 533, the transport container 110 reaches the destination location. In certain embodiments, when the electronic controller 230 determines that the first carrier initial location is also the initial location and that the first carrier destination location is also the destination location, the electronic controller 230 also determines that it is not required to autonomously navigate the transport container 110 along a geographic route between the initial location in the destination location. Instead, the electronic controller 230 relies on the first carrier to transport the transport container 110 from the initial location to the destination location. When the transport container 110 reaches the destination location, the transport container 110 may lock one or more locking bars (e.g., locking bars 220 and 225) and engage the transport container 110 with one or more anchor points. Additionally, or alternatively, when the transport container 110 reaches its destination location, the transport container 110 may unlock the cover lock 215 and transition the cover 212 from the closed state to the open state so that a package can be retrieved from the cavity 265. In some embodiments, the electronic controller 230 transmits a signal to the electronic device 115 or the server 125 to display an indication that the transport container 110 is located at the destination location.

Turning back to FIG. 5A, at step 525, the electronic controller 230 determines whether the first carrier destination location is also the destination location. Turning now to FIG. 5C, if the electronic controller 230 determines that the first carrier destination location is not the destination location then, at step 535, the electronic controller 230 determines a second geographic route first carrier destination location to the destination location. For example, after the electronic controller 30 determines that the first carrier initial location is also the initial location, the electronic controller 230 determines that the electronic controller 230 is to deploy the transport container 110 to the first carrier. In addition, after the electronic controller 230 determines that the first carrier destination location is not the same location as the destination location, the electronic controller 230 determines that it needs to formulate a geographic route from the first carrier destination location for autonomous navigation by the electronic controller 230 in order for the transport container 110 to continue transport to the destination location. Thus, using one or more of the transportation information, the first carrier transfer information, the weather information, or the traffic information, the electronic controller 230 determines a second geographic route from the first carrier destination location to the destination location. In certain embodiments, the second geographic route is a portion or a segment of the first geographic route. Alternatively, the second geographic route includes one or more segments that deviate from the first geographic route.

At step 537, the electronic controller 230 determines whether a second carrier is needed for the transport container 110 to reach the destination location from the first carrier destination location within the parameters provided by the transportation information (e.g., a specified time that the transport container 110 is to reach the destination location). For example, the electronic controller 230 determines that no matter which route of the one or more geographic routes that the electronic controller 230 selects for the second geographic route, the electronic controller 230 is unable to navigate the transport container 110 from the first carrier destination location to the destination location under the direction of the transportation information without assistance from a second carrier. The electronic controller 230 may determine that, without a second carrier, the transport container 110 will not reach the destination location at a customer specified time. Additionally, or alternatively, the electronic controller 230 may determine that the electronic controller 230 is unable to navigate particular segments of the second geographic route and thus, requires the assistance of a second carrier.

If the electronic controller 230 determines that the transport container 110 does require a second carrier to reach the destination location or if the electronic controller 230 determines that a request for a second carrier has been received, then at step 539, the electronic controller 230 receives second carrier transfer information. In certain embodiments, the electronic controller 230 sends a request to a second carrier to receive second carrier transfer information. For example, upon determining that the electronic controller 230 is unable to navigate the transport container 110 at least some of the distance between the first carrier destination location and the destination location, the electronic controller 230 sends a request to a second carrier for assistance to transport the transport container 110. The request may include the transportation information, the first carrier transfer information, one or more geographic routes including the second geographic route, and one or more segments of the geographic routes where assistance by the second carrier is needed so that the second carrier can sufficiently assist with the transport of the transport container 110. In certain embodiments, the request includes the specified time of delivery (e.g., a time when a customer has requested that the transport container 110 reach the destination location) so that the second carrier can sufficiently accommodate the customer's specified delivery time. In response to transmitting the request, the electronic controller 230 receives second carrier transfer information from the second carrier (e.g., a server associated with the second carrier or an electronic device associated with the second carrier) identifying a second carrier initial location where the electronic controller 230 is to deploy the transport container 110 to the second carrier and a second carrier destination location where either the transport container 110 reaches the destination location or where the electronic controller 230 reestablishes autonomous navigation of the transport container 110.

In certain embodiments, the second carrier transfer information is stored in the memory 310 of the electronic controller 230. For example, the second carrier transfer information is transmitted to the electronic controller 230 when a request to use the second carrier is received. Upon determining, by the electronic controller 230, that the request to use the second carrier has been received, the electronic controller 230 accesses the memory 310 to retrieve second carrier transfer information. In some embodiments, the second carrier transfer information may include one or more carrier initial locations, one or more carrier destination locations, estimated transport times between each of the one or more carrier initial locations and each of the one or more carrier destination locations. The electronic controller 230, in combination with the determined one or more geographic routes including the second geographic route, the traffic information, the weather information, the first carrier transfer information, and the transportation information, may use the second carrier transfer information to determine an optimal second carrier initial location and an optimal second carrier destination location satisfying the customer specified order as well as the parameters of the second carrier. In response to determining the optimal second carrier initial location and the optimal second carrier destination location, the electronic controller 230 notifies the second carrier of these determined locations.

At step 541, the electronic controller 230 identifies a second carrier initial location and a second carrier destination location. The second carrier initial location and the second carrier destination location are identified in the second carrier transfer information. In certain embodiments, the second carrier initial location is also the first carrier destination location identified in the first carrier transfer information. In this case, the electronic controller 230 generates for display second carrier transfer information when the transport container is at the first carrier destination location and deploys the transport container 110 to the second carrier for transport by the second carrier from the first carrier destination location as similarly described with respect to the first carrier at steps 529 and 531. The second carrier may also transport the transport container 110 so that the transport container reaches the destination location as similarly described with respect to the first carrier at step 533.

At step 542, the electronic controller 230 determines that the second carrier initial location is not the first carrier destination location. At step 543, the electronic controller 230 determines that the second carrier destination location is also the destination location. For example, after the electronic controller 230 has received the transportation information, the first carrier transfer information, and the second carrier transfer information, the electronic controller 230 compares the GPS coordinates or the addresses of both the first carrier destination location and the second carrier initial location and determines that the second carrier initial location is not the first carrier destination location. The electronic controller 230 also compares the GPS coordinates or the addresses of both the second carrier destination location and the destination location and determines that the second carrier destination location is also the destination location.

Upon determining that the second carrier initial location is not the first carrier destination location and that the second carrier destination location is also the destination location, at step 545, the electronic controller 230 determines a third geographic route from the first carrier destination location to the second carrier initial location. The electronic controller 230 uses one or more of the transportation information, the first carrier transfer information, the second carrier transfer information, the weather information, or the traffic information, to determine the geographic route from the first carrier destination location to the second carrier initial location. In certain embodiments, the third geographic route is a portion or a segment of the second geographic route. Alternatively, the third geographic route includes one or more segments that deviate from the second geographic route.

At step 547, the electronic controller 230 generates for display the first carrier transfer information when the transport container 110 is at the initial location. Step 547 is at least similar to step 529 of method 500 illustrated in FIG. 5B. At step 549, the electronic controller 230 deploys the transport container 110 to the first carrier when the transport container 110 is at the initial location. Step 549 is at least similar to step 531 of method 500 illustrated in FIG. 5B.

After the electronic controller 230 deploys the transport container 110 to the first carrier, the first carrier transports the transport container 110 to the first carrier destination location. Once at the first carrier destination location, the electronic controller 230 determines that the location of the transport container 110 is the first carrier destination location using one or more location sensors 340, as described herein. When the electronic controller 230 determines that transport container 110 is at the first carrier destination location, the electronic controller 230, at step 551, the electronic controller 230 generates at least some of the transportation information for display on a display screen. The displayed transportation information may include the customer's name, an initial location departure time for the delivery order, initial location GPS coordinates for the delivery order, an initial location address for the delivery order, a package recipient's name for the delivery order, a requested destination arrival time for the delivery order, destination location GPS coordinates for the delivery order, a destination location address for the delivery order, a package type, size, dimensions, weight, any special accommodations for the delivery order, one or more determined geographic routes for the delivery order, traffic information associated with the geographic routes for the delivery order, weather information associated with the geographic routes for the delivery order, or transportation route information for one or more vehicles that may carry the transport container 110 from the initial location to the destination location. The displayed transportation information informs the first carrier (e.g., a transport vehicle associated with the first carrier, an employee of the first carrier) that the transport container 110 is no longer to be transported by the first carrier.

At step 553, the electronic controller 230 deploys the transport container 110 from the initial location along the third geographic route. For example, the electronic controller 230 deploys the transport container 110 from the first carrier destination location along the third geographic route by transmitting a signal to a particular transport vehicle to pick-up the transport container 110 to begin movement of the transport container 110 along the third geographic route. As another example, the transport container 110 is electronically and physically coupled to a transport vehicle. The electronic controller 230 deploys the transport container 110 from the first carrier destination location along the third geographic route by commanding the transport vehicle to begin moving along the third geographic route.

At step 555, the electronic controller 230 generates for display the second carrier transfer information when the transport container 110 is at the second carrier initial location. For example, after the electronic controller 230 deploys the transport container 110 along the third geographic route, the electronic controller 230 determines that the electronic controller 230 is to deploy the transport container 110 to the second carrier when the transport container 110 is at the second carrier initial location. While the transport container 110 is at the second carrier initial location, the electronic controller 230 generates for display the second carrier transfer information so that a worker or a transport vehicle associated with the second carrier can identify that the transport container 110 is to be transported by the second carrier. In certain embodiments, the second carrier transfer information is displayed on a display screen of the transport container 110. Additionally, or alternatively, the second carrier transfer information is displayed on an electronic device associated with the second carrier (e.g., a handset implementing an API or stationary computer terminal implementing an API).

At step 557, the electronic controller 230 deploys the transport container 110 to the second carrier when the transport container 110 is at the second carrier initial location. In certain embodiments, deploying the transport container 110 to the second carrier includes transmitting a signal to the second carrier instructing the second carrier to retrieve the transport container 110 at the second carrier initial location. For example, after the transport container 110 reaches the second carrier initial location, the electronic controller 230 deploys the transport container 110 to the second carrier by transmitting a signal to a server, a transport vehicle, or an electronic device of the second carrier (e.g., an electronic device of the second carrier implementing an API) instructing the second carrier to retrieve the transport container 110 at the second carrier initial location and in accordance with the transportation information.

In certain embodiments, deploying the transport container 110 to the second carrier includes receiving data inputs from one or more sensors of the transport container 110 or actuating one or more actuators of the transport container 110. For example, after the transport container 110 reaches the second carrier initial location, the electronic controller 230 engages one or more of the locking bars 220 and 225 to anchor points at the second carrier initial location and actuates the locking bars 220 or 225 to the closed position securing the transport container 110 to the anchor points at the second carrier initial location. The electronic controller 230 subsequently actuates the locking bars 220 and 225 to the open position as part of a process including one or more steps for deploying the transport container 110. As yet another example, after the transport container 110 reaches the second carrier initial location, the electronic controller 230 verifies that the cover 212 is in the closed position, verifies that the cover lock 215 is in the locked position, or verifies that the locking bars 220 and 225 are in the open position. In certain embodiments, the electronic controller 230 deploys the transport container 110 to the second carrier by actuating the locking bars 220 or 225 so that the locking bars 220 and 225 are in the open position in response to receiving an authentication code from an electronic device of the second carrier.

At step 559, the transport container 110 reaches the destination location. For example, while being transported by the second carrier or after being released from transport by the second carrier, the electronic controller 230 determines, using the locations sensors 340, that the current location of the transport container 110 is the destination location. In certain embodiments, when the transport container 110 reaches the destination location, the electronic controller 230 may lock one or more locking bars (e.g., locking bars 220 and 225) and engage the transport container 110 with one or more anchor points. Additionally, or alternatively, when the transport container 110 reaches the destination location, the electronic controller 230 may unlock the cover lock 215 and transition the cover 212 from the closed state to the open state so that a package can be retrieved from the cavity 265. In some embodiments, the electronic controller 230 transmits a signal to the electronic device 115 or the server 125 to display an indication that the transport container 110 is located at the destination location.

Figure 5D:
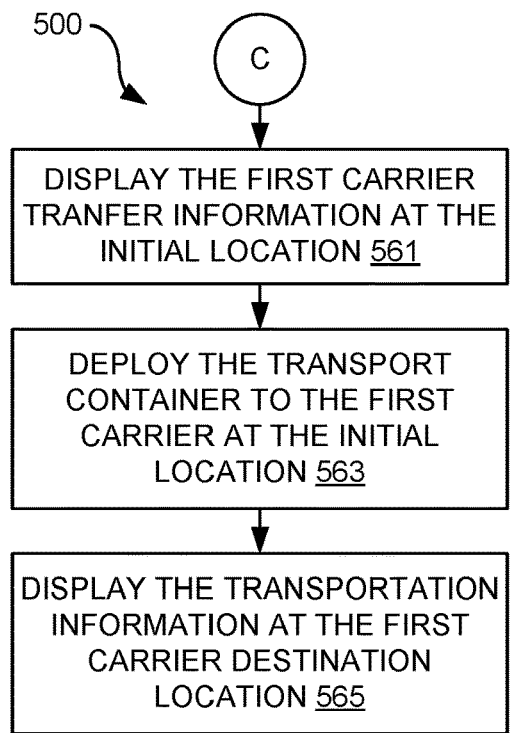
Figure 5D:
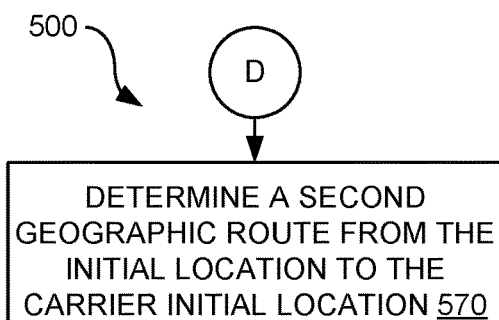
Figure 5D:
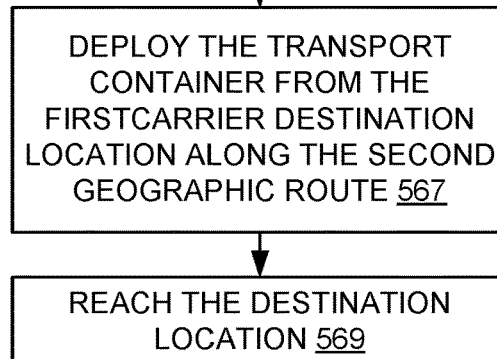

Turning back to step 537, if the electronic controller 230 determines that the transport container 110 does not require a second carrier to reach the destination location or if the electronic controller 230 determines that a request for a second carrier has not been received then, at step 561, shown in FIG. 5D, the electronic controller 230 generates for display the first carrier transfer information when the transport container 110 is at the initial location. Step 561 is at least similar to step 529 of method 500 illustrated in FIG. 5B. At step 563, the electronic controller 230 deploys the transport container 110 to the first carrier when the transport container 110 is at the initial location. Step 561 is at least similar to step 531 of method 500 illustrated in FIG. 5B.

At step 565, the electronic controller 230 generates at least some of the transportation information for display on a display screen when the transport container 110 is at the first carrier destination location. The displayed transportation information may include the customer's name, an initial location departure time for the delivery order, initial location GPS coordinates for the delivery order, an initial location address for the delivery order, a package recipient's name for the delivery order, a requested destination arrival time for the delivery order, destination location GPS coordinates for the delivery order, a destination location address for the delivery order, a package type, size, dimensions, weight, any special accommodations for the delivery order, one or more determined geographic routes for the delivery order, traffic information associated with the geographic routes for the delivery order, weather information associated with the geographic routes for the delivery order, or transportation route information for one or more vehicles that may carry the transport container 110 from the initial location to the destination location.

At step 567, the electronic controller 230 deploys the transport container 110 from the first carrier destination location along the second geographic route. For example, the electronic controller 230 deploys the transport container 110 from the first carrier destination location along the second geographic route by transmitting a signal to a particular transport vehicle to pick-up the transport container 110 to begin movement of the transport container 110 along the second geographic route. As another example, the transport container 110 is electronically and physically coupled to a transport vehicle. The electronic controller 230 deploys the transport container 110 from the first carrier destination location along the second geographic route by commanding the transport vehicle to begin moving along the second geographic route.

At step 569, the transport container 110 reaches the destination location. For example, the electronic controller 230 guides the transport container 110 along the second geographic route until the transport container 110 reaches the destination location. When the transport container 110 reaches the destination location, the electronic controller 230 may lock one or more locking bars (e.g., locking bars 220 and 225) and engage the transport container 110 with one or more anchor points. Additionally, or alternatively, when the transport container 110 reaches the destination location, the electronic controller 230 may unlock the cover lock 215 and transition the cover 212 from the closed state to the open state so that a package can be retrieved from the cavity 265. In some embodiments, the electronic controller 230 transmits a signal to the electronic device 115 or the server 125 to display an indication that the transport container 110 is located at the destination location.

Turning back to FIG. 5A, at step 523, the electronic controller 230 determines whether the first carrier initial location is also the initial location. If the electronic controller 230 determines that the first carrier initial location is not the initial location then, at step 527, the electronic controller 230 determines whether the first carrier destination location is also the destination location. Step 527 is at least similar to step 525 of method 500 illustrated in FIG. 5A.

Figure 5E:
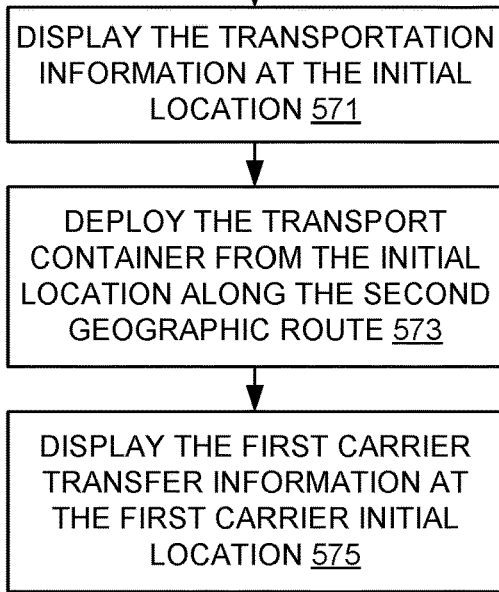
Figure 5E:
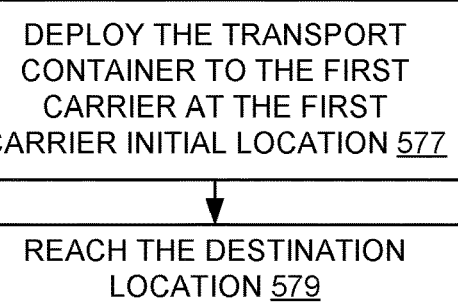
Figure 5C:
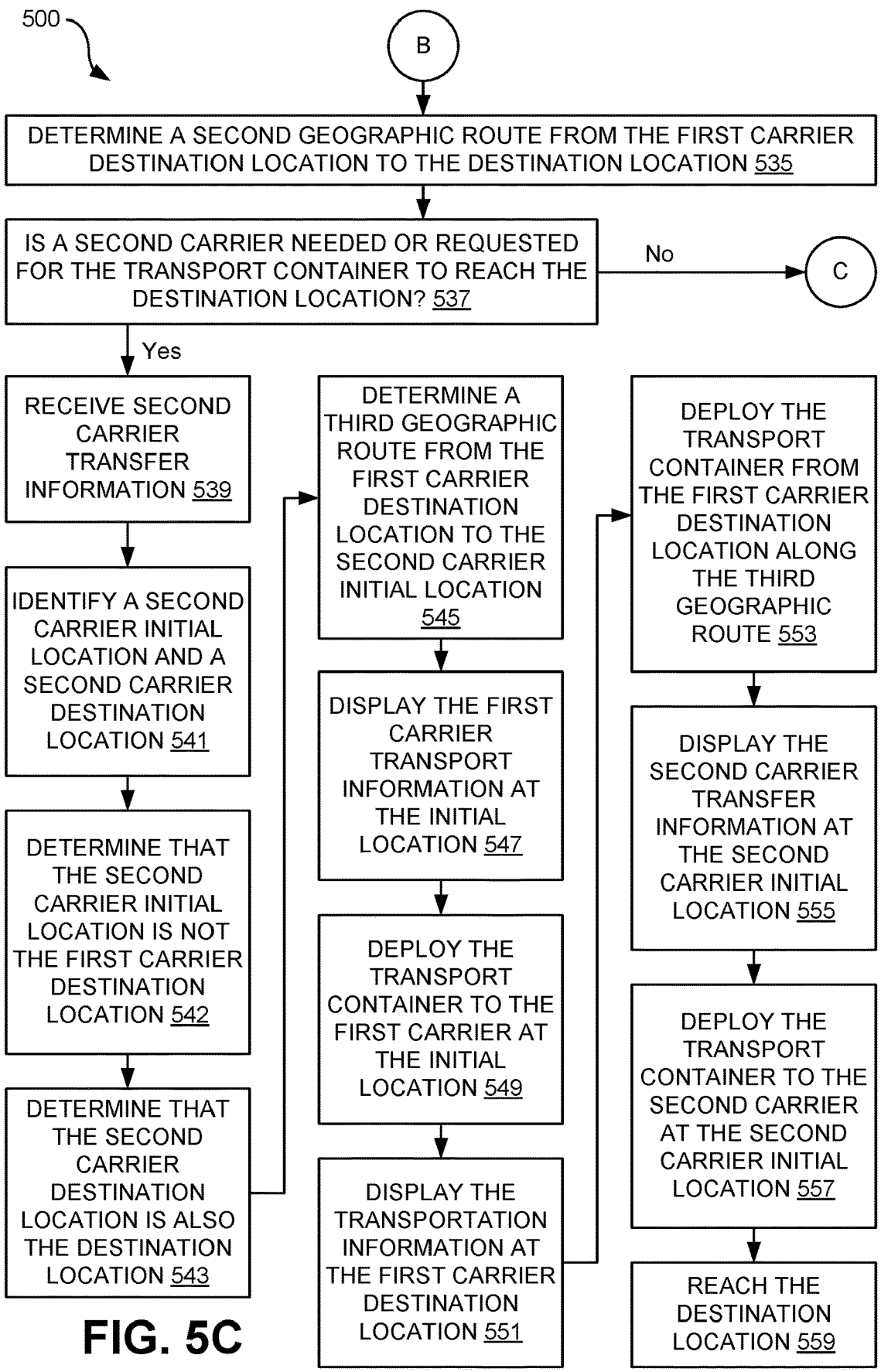

Turning to FIG. 5E, if the electronic controller 230 determines that the first carrier destination location is also the destination location then, at step 570, the electronic controller 230 determines a second geographic route from the initial location to the first carrier initial location. For example, using one or more of the transportation information, the first carrier transfer information, the weather information, or the traffic information, the electronic controller 230 determines a second geographic route from the initial location to the first carrier initial location. In certain embodiments, the second geographic route is a portion or a segment of the first geographic route. Alternatively, the second geographic route includes one or more segments that deviate from the first geographic route.

At step 571, the electronic controller 230 generates at least some of the transportation information for display on a display screen at the initial location. The displayed transportation information may include the customer's name, an initial location departure time for the delivery order, initial location GPS coordinates for the delivery order, an initial location address for the delivery order, a package recipient's name for the delivery order, a requested destination arrival time for the delivery order, destination location GPS coordinates for the delivery order, a destination location address for the delivery order, a package type, size, dimensions, weight, any special accommodations for the delivery order, one or more determined geographic routes for the delivery order, traffic information associated with the geographic routes for the delivery order, weather information associated with the geographic routes for the delivery order, or transportation route information for one or more vehicles that may carry the transport container 110 from the initial location to the destination location.

At step 573, the electronic controller 230 deploys the transport container 110 from the initial location along the second geographic route. For example, the electronic controller 230 deploys the transport container 110 from the initial location along the second geographic route by transmitting a signal to a particular transport vehicle to pick-up the transport container 110 to begin movement of the transport container 110 along the second geographic route. As another example, the transport container 110 is electronically and physically coupled to a transport vehicle. The electronic controller 230 deploys the transport container 110 from the initial location along the second geographic route by commanding the transport vehicle to begin moving along the second geographic route.

At step 575, the electronic controller 230 generates for display the first carrier transfer information when the transport container 110 is located at the first carrier initial location. For example, after the electronic controller 230 deploys the transport container 110 along the second geographic route, the electronic controller 230 determines that the electronic controller 230 is to deploy the transport container 110 to the first carrier when the transport container 110 is located at the first carrier initial location. While the transport container 110 is located at the first carrier initial location, the electronic controller 230 generates for display the first carrier transfer information so that a worker or a transport vehicle associated with the first carrier can identify that the transport container 110 is to be transported by the first carrier. In certain embodiments, the first carrier transfer information is displayed on a display screen of the transport container 110. Additionally, or alternatively, the first carrier transfer information is displayed on an electronic device associated with the first carrier (e.g., a handset implementing an API or stationary computer terminal implementing an API).

At step 577, the electronic controller 230 deploys the transport container 110 to the first carrier when the transport container 110 is located at the first carrier initial location. In certain embodiments, deploying the transport container 110 to the first carrier includes transmitting a signal to the first carrier instructing the first carrier to retrieve the transport container 110 at the first carrier initial location. For example, after the transport container 110 reaches the first carrier initial location, the electronic controller 230 deploys the transport container 110 to the first carrier by transmitting a signal to a server, a transport vehicle, or an electronic device of the first carrier (e.g., an electronic device of the first carrier implementing an API) instructing the first carrier to retrieve the transport container 110 at the first carrier initial location and in accordance with the transportation information.

In certain embodiments, deploying the transport container 110 to the first carrier includes receiving data inputs from one or more sensors of the transport container 110 or actuating one or more actuators of the transport container 110. For example, after the transport container 110 reaches the first carrier initial location, the electronic controller 230 engages one or more of the locking bars 220 and 225 to anchor points at the first carrier initial location and actuates the locking bars 220 or 225 to the closed position securing the transport container 110 to the anchor points at the first carrier initial location. The electronic controller 230 subsequently actuates the locking bars 220 and 225 to the open position as part of a process including one or more steps for deploying the transport container 110. As yet another example, after the transport container 110 reaches the first carrier initial location, the electronic controller 230 verifies that the cover 212 is in the closed position, verifies that the cover lock 215 is in the locked position, or verifies that the locking bars 220 and 225 are in the open position. In certain embodiments, the electronic controller 230 deploys the transport container 110 to the first carrier by actuating the locking bars 220 or 225 so that the locking bars 220 and 225 are in the open position in response to receiving an authentication code from an electronic device of the first carrier.

At step 579, the transport container 110 reaches the destination location. For example, while being transported by the first carrier or after being released from transport by the first carrier, the electronic controller 230 determines, using the locations sensors 340, that the current location of the transport container 110 is the destination location. In certain embodiments, when the transport container 110 reaches the destination location, the electronic controller 230 may lock one or more locking bars (e.g., locking bars 220 and 225) and engage the transport container 110 with one or more anchor points. Additionally, or alternatively, when the transport container 110 reaches the destination location, the electronic controller 230 may unlock the cover lock 215 and transition the cover 212 from the closed state to the open state so that a package can be retrieved from the cavity 265. In some embodiments, the electronic controller 230 transmits a signal to the electronic device 115 or the server 125 to display an indication that the transport container 110 is located at the destination location.

Figure 5F:
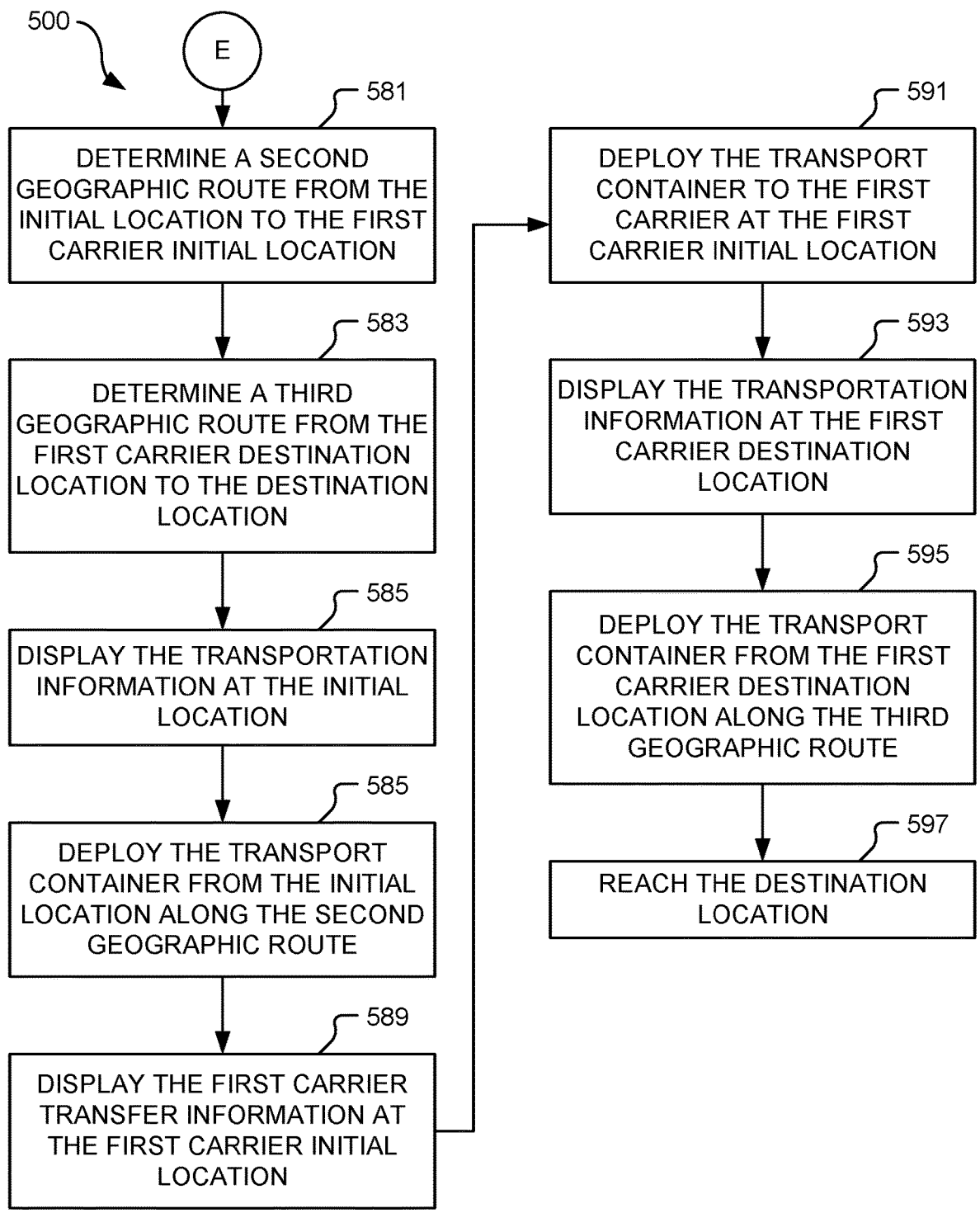

Turning back to FIG. 5A, at step 527, the electronic controller 230 determines whether the first carrier destination location is also the destination location. Turning now to FIG. 5F, if the electronic controller 230 determines that the first carrier destination location is not the destination location then, at step 581, the electronic controller 230 determines a second geographic route from the initial location to the first carrier initial location. For example, using one or more of the transportation information, the first carrier transfer information, the weather information, or the traffic information, the electronic controller 230 determines a second geographic route from the initial location to the first carrier initial location. In certain embodiments, the second geographic route is a portion or a segment of the first geographic route. Alternatively, the second geographic route includes one or more segments that deviate from the first geographic route.

At step 583, the electronic controller 230 determines a third geographic route from the first carrier destination location to the destination location. For example, using one or more of the transportation information, the first carrier transfer information, the weather information, or the traffic information, the electronic controller 230 determines a third geographic route from the first carrier destination location to the destination location. In certain embodiments, the third geographic route is a portion or a segment of the first geographic route. Alternatively, the third geographic route includes one or more segments that deviate from the first geographic route.

At step 585, the electronic controller 230 generates at least some of the transportation information for display on a display screen at the initial location. Step 585 is at least similar to step 571 of method 500 illustrated in FIG. 5E. At step 587, the electronic controller 230 deploys the transport container 110 from the initial location along the second geographic route. Step 587 is at least similar to step 573 of method 500 illustrated in FIG. 5E. At step 589, the electronic controller 230 generates for display the first carrier transfer information when the transport container 110 is located at the first carrier initial location. Step 589 is at least similar to step 575 of method 500 illustrated in FIG. 5E. At step 591, the electronic controller 230 deploys the transport container 110 to the first carrier when the transport container 110 is located at the first carrier initial location. Step 591 is at least similar to step 577 of method 500 illustrated in FIG. 5E.

At step 593, the electronic controller 230 generates at least some of the transportation information for display on a display screen at the initial location. The displayed transportation information may include the customer's name, an initial location departure time for the delivery order, initial location GPS coordinates for the delivery order, an initial location address for the delivery order, a package recipient's name for the delivery order, a requested destination arrival time for the delivery order, destination location GPS coordinates for the delivery order, a destination location address for the delivery order, a package type, size, dimensions, weight, any special accommodations for the delivery order, one or more determined geographic routes for the delivery order, traffic information associated with the geographic routes for the delivery order, weather information associated with the geographic routes for the delivery order, or transportation route information for one or more vehicles that may carry the transport container 110 from the initial location to the destination location.

At step 595, the electronic controller 230 deploys the transport container 110 from the first carrier destination location along the third geographic route. For example, the electronic controller 230 deploys the transport container 110 from the first carrier destination location along the third geographic route by transmitting a signal to a particular transport vehicle to pick-up the transport container 110 to begin movement of the transport container 110 along the third geographic route. As another example, the transport container 110 is electronically and physically coupled to a transport vehicle. The electronic controller 230 deploys the transport container 110 from the first carrier destination location along the third geographic route by commanding the transport vehicle to begin moving along the third geographic route.

At step 597, the transport container 110 reaches the destination location. For example, the electronic controller 230 guides the transport container 110 along the third geographic route until the transport container 110 reaches the destination location. When the transport container 110 reaches the destination location, the electronic controller 230 may lock one or more locking bars (e.g., locking bars 220 and 225) and engage the transport container 110 with one or more anchor points. Additionally, or alternatively, when the transport container 110 reaches the destination location, the electronic controller 230 may unlock the cover lock 215 and transition the cover 212 from the closed state to the open state so that a package can be retrieved from the cavity 265. In some embodiments, the electronic controller 230 transmits a signal to the electronic device 115 or the server 125 to display an indication that the transport container 110 is located at the destination location.

Figure 6:
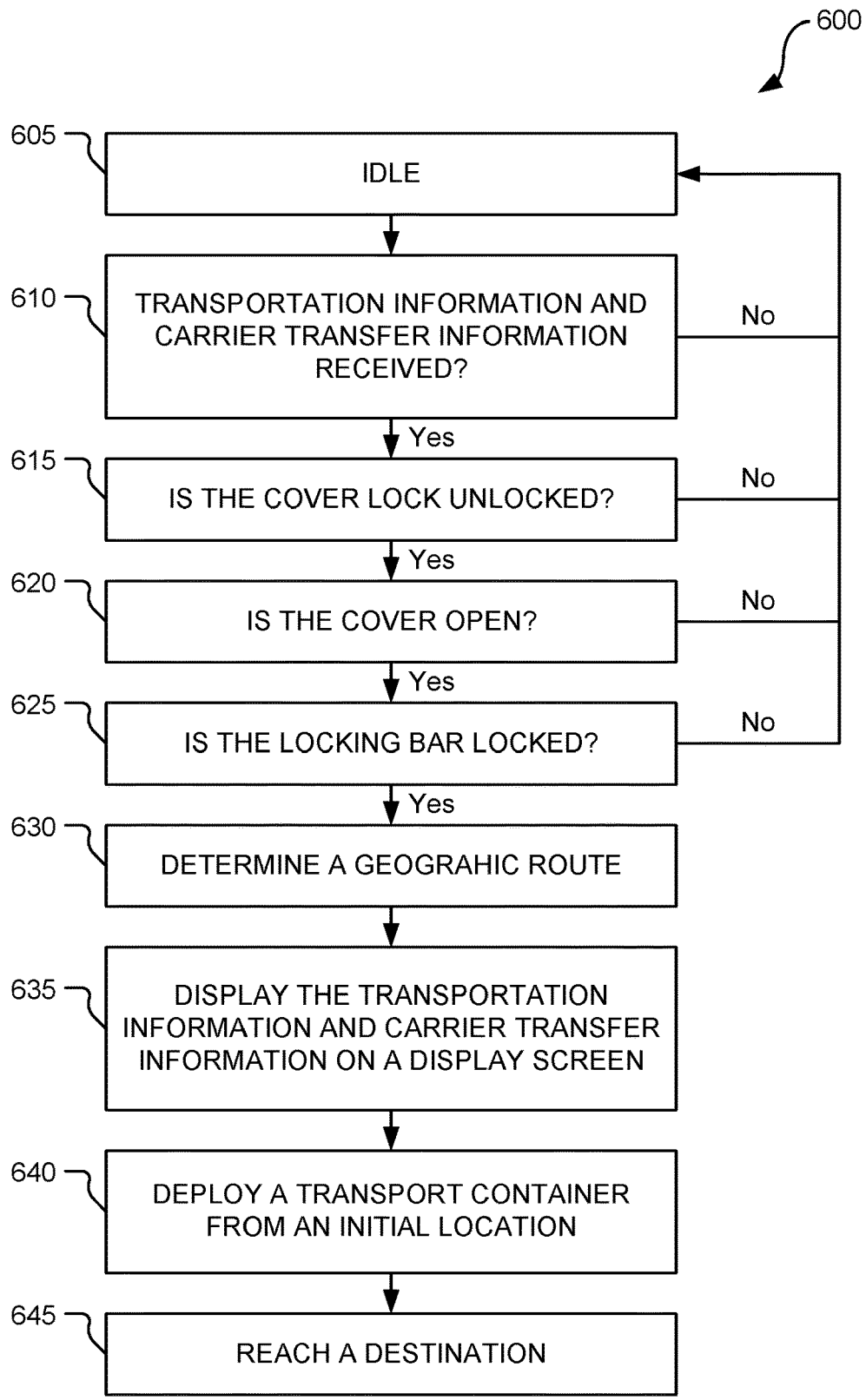
FIG. 6 illustrates another method implemented by an electronic controller of a transport container for performing carrier interface operations according to certain embodiments of this disclosure.

FIG. 6 illustrates a method 600 implemented by an electronic controller 230 of a transport container 110 for performing carrier interface operations according to certain embodiments of this disclosure. Although certain details are provided with reference to the method 600 of FIG. 6, it should be understood that other embodiments may include more, less, or different method steps. At step 605, the electronic controller 230 of the transport container 110 is in an idle state at least with respect to performing carrier interface operations. At step 610, the electronic controller 230 determines whether transportation information and carrier transfer information has been received. If transportation information has not been received or if carrier transfer information has not been received, then the electronic controller 230 returns to idle at step 605. If transportation information and carrier transfer information has been received, then the electronic controller 230 proceeds to step 615.

As discussed herein, transportation information includes a customer's or a shipper's name, billing address, and payment information, a number of packages to be delivered, a size, dimensions, and weight of each package to be delivered, an initial location to pick up and begin transport of a package, a requested date and time to pick up and begin transport of a package from an initial location, a destination or final location to deposit and end transport of a package, a requested date and time for reaching a destination or final location to deposit and end transport of a package, one or more special requirements needed for transporting a package, or the like. Also, as discussed herein, carrier transfer information includes GPS coordinates of a carrier initial location, an address of a carrier initial location, GPS coordinates of a carrier destination location, an address of a destination initial location, route information, an estimated arrival time of the transport container at the carrier initial location, an estimated departure time of the transport container 110 from a carrier initial location, an estimated arrival time of the transport container 110 at a carrier destination location, carrier storage dimensions, a carrier's name, a transportation type, package information, a type of information (e.g., whether the information is carrier transfer information, rerouting information, or both).

At step 615, the electronic controller 230 determines whether the cover lock 215 is unlocked. If the electronic controller 230 determines that the cover lock 215 is not unlocked, then the electronic controller 230 returns to idle at step 605. If the electronic controller 230 determines that the cover lock 215 is unlocked, then the electronic controller 230 proceeds to step 620. At step 620, the electronic controller 230 determines whether the cover 212 is in the open state. If the electronic controller 230 determines that the cover 212 is not in the open state, then the electronic controller 230 returns to idle at step 605. If the electronic controller 230 determines that the cover 212 is in the open state, then the electronic controller 230 proceeds to step 625.

In certain embodiments, determining whether the cover lock 215 is in the unlocked state or whether the cover is in the open state allows only those with authorization to access the contents within the cavity 265 and initiate carrier interface operations, as described herein. For example, when the electronic controller 230 determines that the cover lock 215 is in the unlocked state or that the cover 212 is in the open state, the electronic controller 230 can perform one or more carrier interface operations as described herein. Conversely, when the electronic controller 230 determines that the cover lock 215 is in the locked state and that the cover 212 is in the closed state, the electronic controller 230 is unable to perform one or more carrier interface operations.

At step 625, the electronic controller 230 determines whether one or more locking bars (e.g., the first locking bar 220 or the second locking bar 225) is locked. If the electronic controller 230 determines that every locking bar is unlocked, then the electronic controller 230 returns to idle at step 605. If the electronic controller 230 determines that at least one locking bar is locked, then the electronic controller 230 proceeds to step 630.

In certain embodiments, determining whether at least one locking bar is in the locked state prevents unauthorized individual from tempering with the transport directions provided to the transport container 110. For example, when the electronic controller 230 determines that either of the locking bars 220 and 225 is in the locked state, the electronic controller 230 can perform one or more carrier interface operations as described herein. Conversely, when the electronic controller 230 determines that both locking bars 220 and 225 are in the unlocked state, the electronic controller 230 is unable to perform one or more carrier interface operations.

At step 630, the electronic controller 230 determines a geographic route from an initial location to a destination location based on the received transportation information and the carrier transfer information. For example, the electronic controller 230 uses the data received from the transportation information including an initial location to pick up and begin transport of the package and the destination location to deposit the package and end delivery of the package and accesses data stored in the memory 310 to identify the transport container's current location, map information that includes the transport container's current location, the initial location to pick up and begin transport of the package, and the destination location to deposit the package and end delivery of the package. In some embodiments, the electronic controller 230 may also access data stored in the memory 310 that includes traffic information, weather information, transportation route information of one or more vehicles that carry transport containers between locations, or the like. In addition, the electronic controller 230 uses carrier transfer information to determine if and where a first carrier or a second carrier is to pick up the transport container 110 at the initial location or along a geographic route or drop off the transport container 110 along a geographic route or at the destination location. Using the transportation information, the carrier transfer information, and the information stored in the memory 310, the electronic controller 230 navigates and schedules the transport of the transport container 110 from the initial location to the destination location.

At step 635, the electronic controller 230 displays or generates and transmits for display at least some of the received transportation information or the carrier transfer information on a display screen. The displayed transportation information may include the customer's name, an initial location departure time for the delivery order, initial location GPS coordinates for the delivery order, an initial location address for the delivery order, a package recipient's name for the delivery order, a requested destination arrival time for the delivery order, destination location GPS coordinates for the delivery order, a destination location address for the delivery order, a package type, size, dimensions, weight, any special accommodations for the delivery order, one or more determined geographic routes for the delivery order, traffic information associated with the geographic routes for the delivery order, weather information associated with the geographic routes for the delivery order, or transportation route information for one or more vehicles that may carry the transport container 110 from the initial location to the destination location.

The displayed carrier transfer information may include GPS coordinates of a carrier initial location (e.g., a location where a carrier picks up the transport container 110 for transport by the carrier), an address of a carrier initial location, GPS coordinates of a carrier destination location (e.g., a location where a carrier drops off the transport container 110 after transport by the carrier), an address of a destination initial location, route information, an estimated arrival time of the transport container at the carrier initial location, an estimated departure time of the transport container 110 from a carrier initial location, an estimated arrival time of the transport container 110 at a carrier destination location, carrier storage dimensions, a carrier's name, a transportation type, package information, a type of information (e.g., whether the information is carrier transfer information, rerouting information, or both). In certain embodiments, the electronic controller 230 displays transportation information before the electronic controller 230 begins to navigate the transport container 110 along a geographic route. In certain embodiments, the electronic controller 230 displays carrier transfer information before the electronic controller 230 deploys the transport container 110 to a carrier.

At step 640, the electronic controller 230 deploys the transport container 110 from an initial location. For example, the electronic controller 230 deploys the transport container 110 from an initial location along a geographic route by transmitting a signal to a particular transport vehicle or a particular transport carrier to pick-up the transport container 110 to begin movement of the transport container 110 along the geographic route. As another example, the transport container 110 is electronically and physically coupled to a transport vehicle. The electronic controller 230 deploys the transport container 110 from the initial location along the geographic route by commanding the transport vehicle to begin moving along the geographic route. As yet another example, the electronic controller 230 deploys the transport container 110 to a carrier. Through the carrier transfer information, the carrier informs the electronic controller 230 of the carrier initial location where the carrier is to pick up the transport container 110, the carrier destination location where the carrier is to drop off the transport container 110, and an estimated time that the carrier reaches the carrier destination location. If necessary, the electronic controller 230 navigates the transport container 110 to the carrier initial location. The electronic controller 230 transmits a signal informing the carrier when the transport container 110 is located at the carrier initial location.

At step 645, the transport container 110 reaches the destination location. For example, the electronic controller 230 navigates the transport container 110 along a geographic route from the initial location to the destination location. As another example, the electronic controller 230 deploys the transport container 110 to a carrier so that the carrier transports the transport container from the initial location to the destination location. As yet another example, the electronic controller 230 implements a combination of navigating the transport container 110 along one or more geographic routes and deploying the transport container 110 to one or more carriers, as described herein, so that the transport container 110 reaches the destination location.

When the transport container 110 reaches its destination location, the transport container 110 may lock one or more locking bars (e.g., locking bars 220 and 225) and engage the transport container 110 with one or more anchor points. Additionally, or alternatively, when the transport container 110 reaches its destination location, the transport container 110 may unlock the cover lock 215 and transition the cover 212 from the closed state to the open state so that a package can be retrieved from the cavity 265.

Figure 7:
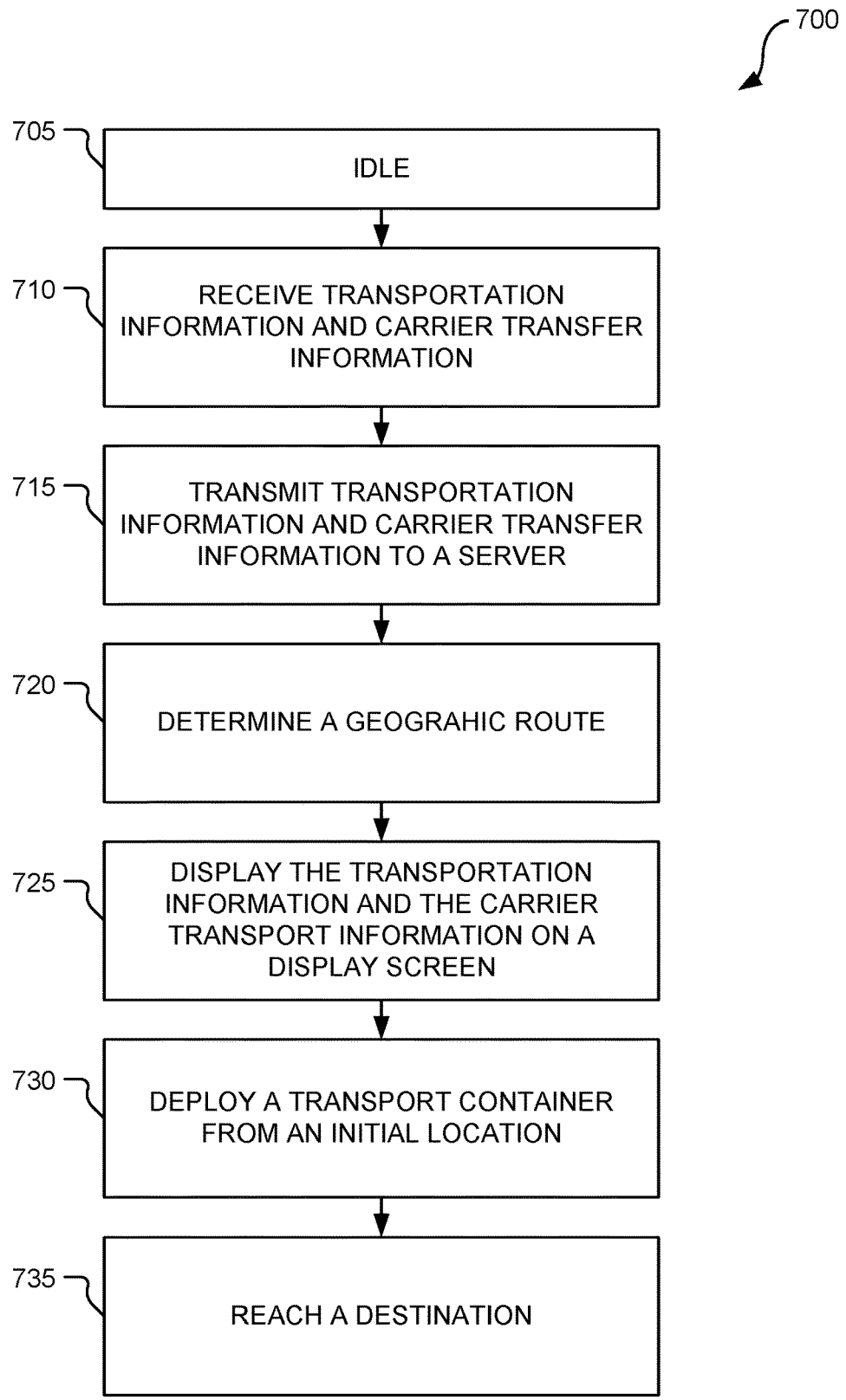
FIG. 7 illustrates another method implemented by an electronic controller of a transport container for performing carrier interface operations according to certain embodiments of this disclosure.

FIG. 7 illustrates a method 700 implemented by an electronic controller 230 of a transport container 110 for performing carrier interface operations according to certain embodiments of this disclosure. Although certain details are provided with reference to the method 700 of FIG. 7, it should be understood that other embodiments may include more, less, or different method steps. At step 705, the electronic controller 230 of the transport container 110 is in an idle state at least with respect to performing carrier interface operations. Step 705 is at least similar to step 605 of method 600 illustrated in FIG. 6. At step 710, the electronic controller 230 determines whether transportation information and carrier transfer information has been received. Step 710 is at least similar to step 610 of method 600 illustrated in FIG. 6.

At step 715, the electronic controller 230 transmits the received transportation information and the received carrier transfer information to the server 125 to back up the transportation information and the carrier transfer information received by the electronic controller 230. In some embodiments, the electronic controller 230 transmits some or all of the data stored in memory 310. This feature allows transportation data information, carrier transfer information, and other data stored in the memory 310 to be quickly and easily access when a transport container failure occurs.

At step 720, the electronic controller 230 determines a geographic route from an initial location to a destination location based on the received transportation information and the carrier transfer information. Step 720 is at least similar to step 630 of method 600 illustrated in FIG. 6. At step 725, the electronic controller 230 displays or generates and transmits for display at least some of the received transportation information or the carrier transfer information on a display screen. Step 725 is at least similar to step 635 of method 600 illustrated in FIG. 6. At step 730, the electronic controller 230 deploys the transport container 110 from an initial location. Step 730 is at least similar to step 640 of method 600 illustrated in FIG. 6. At step 735, the transport container 110 reaches the destination location. Step 735 is at least similar to step 645 of method 600 illustrated in FIG. 6.

Figure 8A:
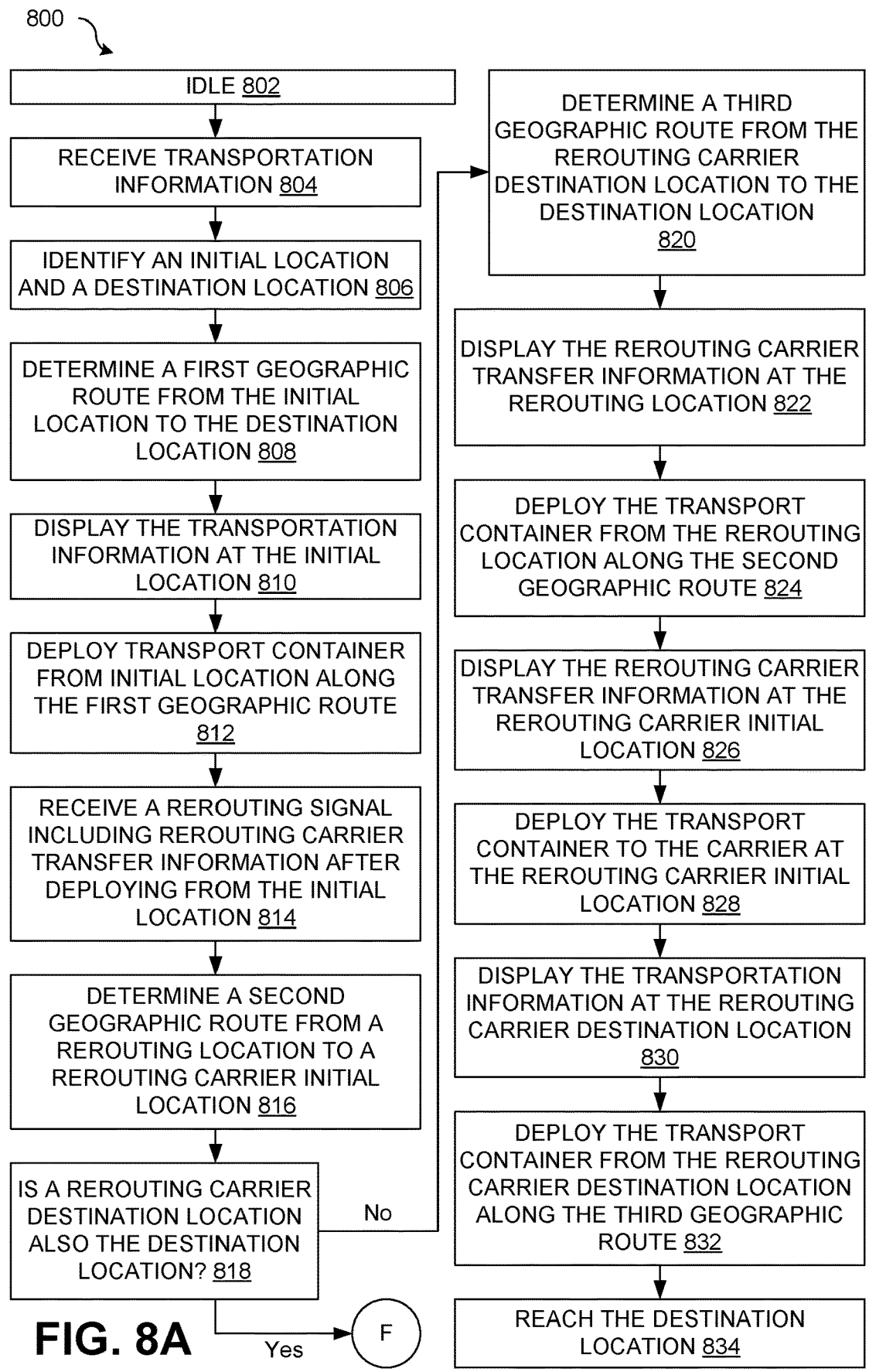
FIGS. 8A and 8B illustrate another method implemented by an electronic controller of a transport container for performing transport container rerouting operations according to certain embodiments of this disclosure.
Figure 8B:
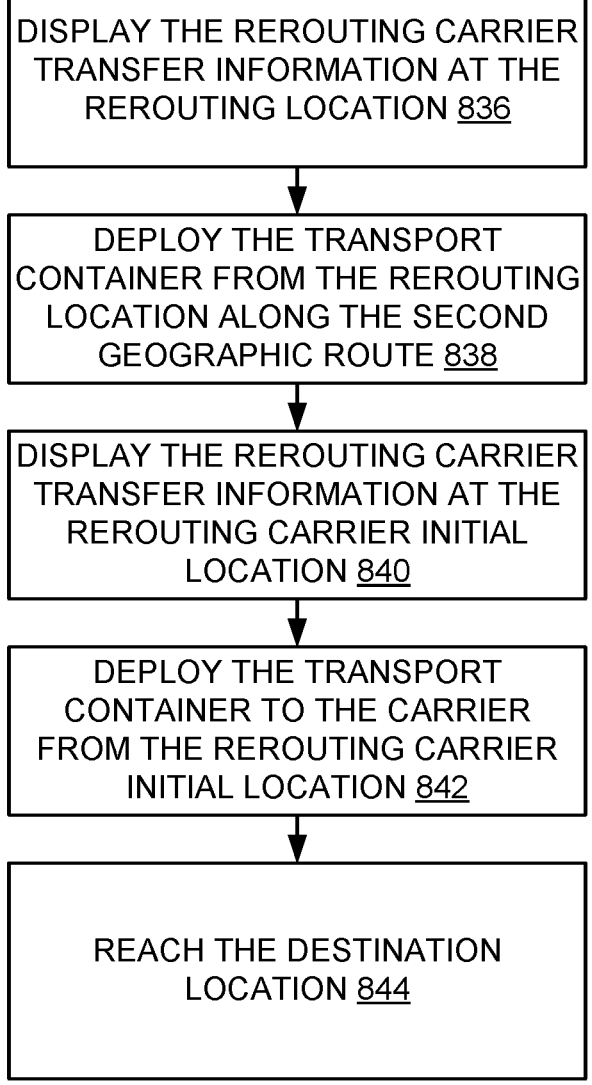

FIGS. 8A and 8B illustrates a method 800 implemented by an electronic controller 230 of a transport container 110 for performing transport container rerouting operations according to certain embodiments of this disclosure. Although certain details are provided with reference to the method 800 of FIGS. 8A and 8B, it should be understood that other embodiments may include more, less, or different method steps. As shown in FIG. 8A, at step 802, the electronic controller 230 of the transport container 110 is in an idle state at least with respect to performing transport container rerouting operations. Step 802 is at least similar to step 501 of method 500 illustrated in FIG. 5A.

At step 804, the electronic controller 230 determines whether transportation information has been received. Transportation information may be received from a mobile device (e.g., a handset, another transport container 110). Transportation information may also be received through the user interface 325, from an electronic device 115 (e.g., a stationary computer terminal), or from a server 125. If the electronic controller 230 determines that transportation information is not received, then the electronic controller 230 returns to idle at step 802. If the electronic controller 230 determines that transportation information has been received, then the electronic controller 230 proceeds to step 806.

At step 808, the electronic controller 230 determines a first geographic route from an initial location to a destination location based on the received transportation information. Step 808 is at least similar to step 507 of method 500 illustrated in FIG. 5A. At step 810, the electronic controller 230 displays or generates and transmits for display at least some of the received transportation information on a display screen at the initial location. Step 810 is at least similar to step 513 of method 500 illustrated in FIG. 5A. At step 812, the electronic controller 230 deploys the transport container 110 from the initial location along the first geographic route. Step 812 is at least similar to step 515 of method 500 illustrated in FIG. 5A.

At step 814, the electronic controller 230 receives a transport container rerouting signal including rerouting information having carrier transfer information. The transport container rerouting signal may include a rerouting authentication code. The rerouting authentication code informs the electronic controller 230 that the transport container rerouting signal is authorized to reroute the transport container 110. The transport container rerouting signal may be received by the electronic controller 230 from electronic device 115 (e.g., an electronic device 115 implementing an API), a server 125 (e.g., a server associated with the transport container 110 or a server associated with a carrier), or another transport container 110.

At step 816, the electronic controller 230 determines a second geographic route from a rerouting location to a rerouting carrier initial location based on the transportation information and the carrier transfer information of the rerouting signal. For example, upon receiving the rerouting signal, the electronic controller 230 identifies the current location of the transport container 110 or future location of the transport container 110 along the current geographical as the rerouting location and determines second geographic route from the rerouting location to the rerouting carrier initial location identified in the carrier transfer information provided in the rerouting signal.

At step 818, electronic controller 230 determines whether a rerouting carrier destination location provided in the carrier transfer information of the rerouting signal is a same location as the destination location. If electronic controller 230 determines that the rerouting carrier destination location is not the same location as the destination location then, at step 820, the electronic controller 230 determines a third geographic route from the rerouting carrier destination location to the destination location. At step 822, the electronic controller 230 displays or generates for display the rerouting carrier transfer information at the rerouting location. At step 824, the electronic controller deploys the transport container 110 from the rerouting location along the second geographic route. At step 826, the electronic controller 230 displays the rerouting carrier transfer information when the transport container 110 is at the rerouting carrier initial location. At step 828, the electronic controller 230 deploys the transport container 110 to the carrier when the transport container is at the rerouting carrier initial location. At step 830, the electronic controller 230 displays the transportation information when the transport container 110 is at the rerouting carrier destination location. At step 832, the electronic controller 230 deploys the transport container 110 from the rerouting carrier destination location along the third geographic route. At step 834, the transport container 110 reaches the destination location. Step 834 is at least similar to step 645 of method 600 illustrated in FIG. 6.

Turning back to step 818, if electronic controller 230 determines that the rerouting carrier destination location is the same location as the destination location then, at step 836 in FIG. 8B, the electronic controller 230 displays rerouting carrier transfer information when the transport container 110 is at the rerouting location. At step 838, the electronic controller 230 deploys the transport container 110 from the rerouting location along the second geographic route. At step 840, the electronic controller 230 displays rerouting carrier transfer information when the transport container 110 is located at the rerouting carrier initial location. At step 842, electronic controller 230 deploys the transport container 110 to the carrier at the rerouting carrier initial location. At step 844, the transport container 110 reaches the destination location. Step 844 is at least similar to step 645 of method 600 illustrated in FIG. 6.

Figure 9:
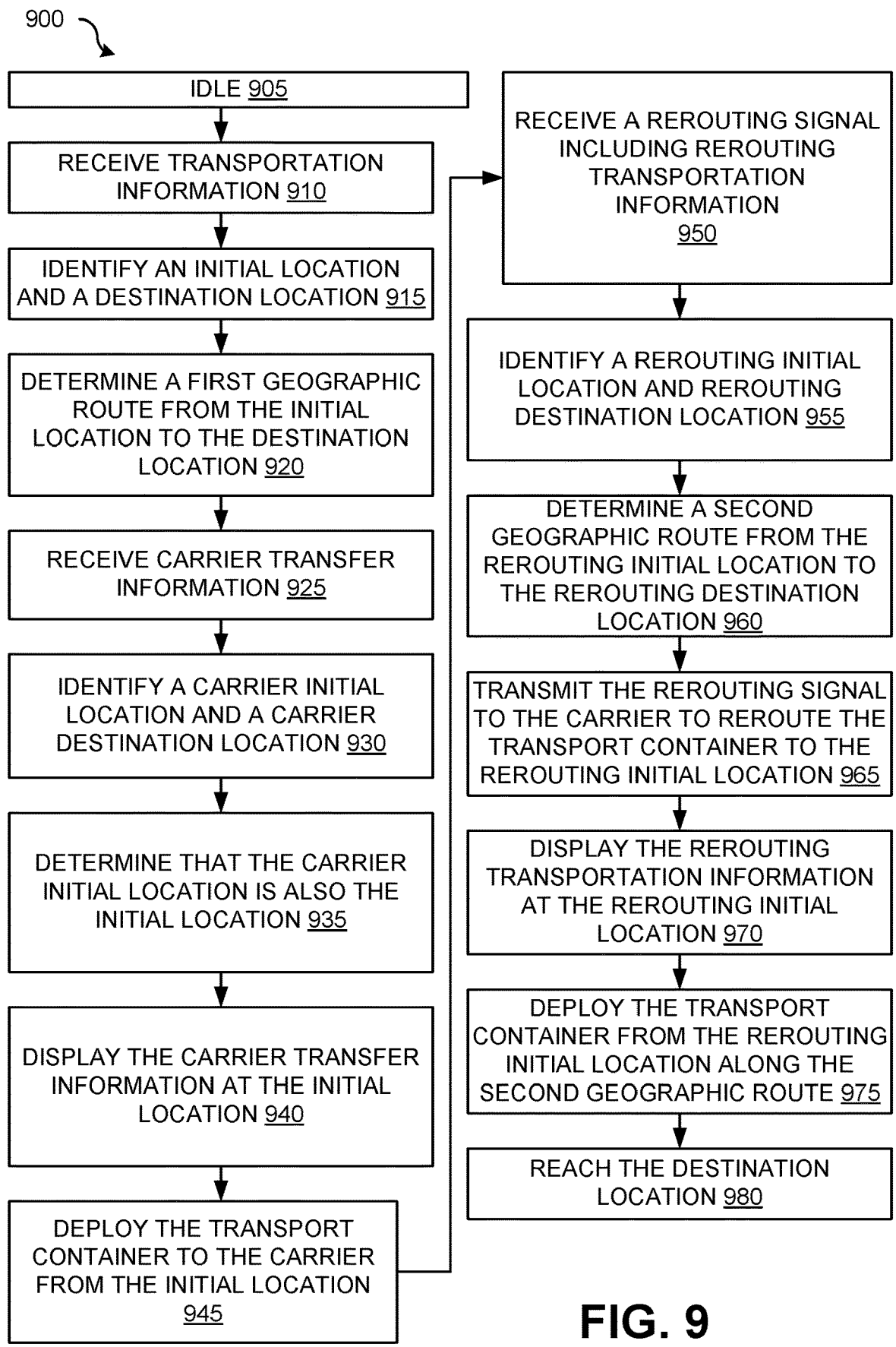
FIG. 9 illustrates another method implemented by an electronic controller of a transport container for performing transport container rerouting operations according to certain embodiments of this disclosure.

FIG. 9 illustrates a method 900 implemented by an electronic controller 230 of a transport container 110 for performing transport container rerouting operations according to certain embodiments of this disclosure. Although certain details are provided with reference to the method 900 of FIG. 9, it should be understood that other embodiments may include more, less, or different method steps. At step 905, the electronic controller 230 of the transport container 110 is in an idle state at least with respect to performing transport container rerouting operations. Step 905 is at least similar to step 501 of method 500 illustrated in FIG. 5A. At step 910, the electronic controller 230 determines that transportation information has been received. Step 910 is at least similar to step 503 of method 500 illustrated in FIG. 5A. At step 915, the electronic controller 230 identifies the initial location and the destination location based on the received transportation information. Step 915 is at least similar to step 505 of method 500 illustrated in FIG. 5A. At step 920, the electronic controller 230 determines a first geographic route from the initial location to destination location. Step 920 is at least similar to step 507 of method 500 illustrated in FIG. 5A. At step 925, the electronic controller 230 determines that carrier transfer information has been received. At step 930, the electronic controller 230 identifies a carrier initial location in a carrier destination location. At step 935, the electronic controller 230 determines that the carrier initial location is a same location as the initial location. At step 940, the electronic controller 230 displays the carrier transfer information when the transport container 110 is located at the initial location. At step 945, the electronic controller 230 deploys the transport container 110 to the carrier when the transport container 110 is located at the initial location. At step 950, electronic controller receives the rerouting signal including rerouting transportation information.

At step 955, the electronic controller identifies a rerouting initial location in a rerouting destination location. In certain embodiments, the rerouting destination location is included in the rerouting transportation information. In certain embodiments, the electronic controller 230 determines the rerouting initial location based on a shortest distance from the current geographic route to the rerouting destination location, on a shortest transportation time of the transport container 110 from the current geographic route to the rerouting destination location, or based on optimizing one or more transport vehicles for transporting the transport container 110 to the rerouting destination location. In certain embodiments, the rerouting initial location is the destination location (e.g., the original destination location) and the rerouting destination location is a new destination location.

At step 960, the electronic controller 230 determines a second geographic route from the rerouting initial location to the rerouting destination location. At step 965, the electronic controller 230 transmits the rerouting signal to the carrier to reroute the transport container to the rerouting initial location. At step 970, the electronic controller 230 displays the rerouting transportation information when the transport container 110 is located at the rerouting initial location. At step 975, the electronic controller deploys the transport container 110 from the rerouting initial location along the second geographic route. At step 980, the transport container 110 reaches the rerouting destination location. In certain embodiments the rerouting destination location is a new destination location. In certain embodiments, the rerouting initial location is the destination location (e.g., the original destination location) and the rerouting destination location is a new destination location.

Figure 10:
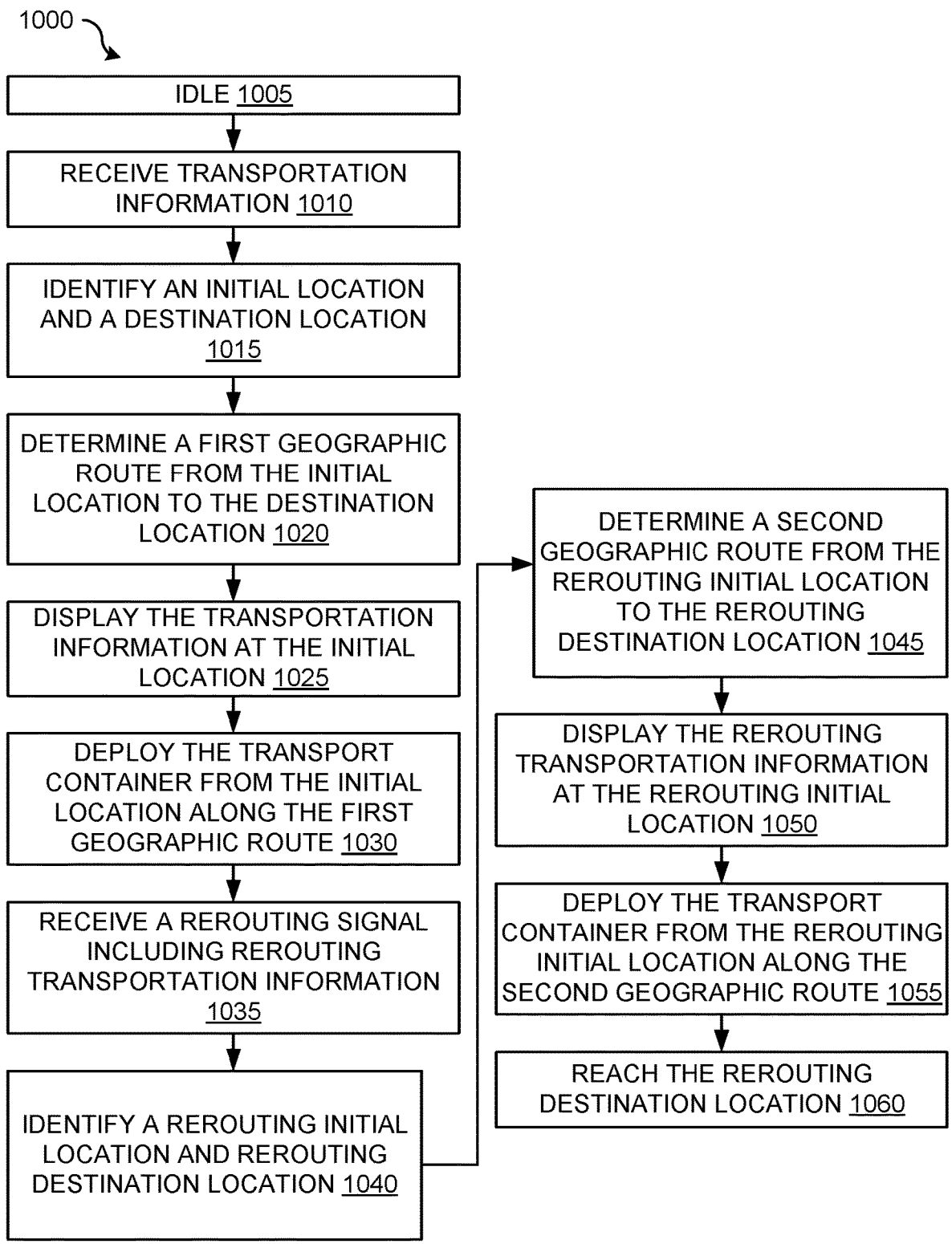
FIG. 10 illustrates a method implemented by an electronic controller of a transport container for performing transport container rerouting operations according to certain embodiments of this disclosure.

FIG. 10 illustrates a method 1000 implemented by an electronic controller 230 of a transport container 110 for performing transport container rerouting operations according to certain embodiments of this disclosure. Although certain details are provided with reference to the method 1000 of FIG. 10, it should be understood that other embodiments may include more, less, or different method steps. At step 1005, the electronic controller 230 of the transport container 110 is in an idle state at least with respect to performing transport container rerouting operations. Step 1005 is at least similar to step 501 of method 500 illustrated in FIG. 5A. At step 1010, the electronic controller 230 determines that transportation information has been received. Step 1010 is at least similar to step 503 of method 500 illustrated in FIG. 5A. At step 1015, the electronic controller 230 identifies the initial location and the destination location based on the received transportation information. Step 1015 is at least similar to step 505 of method 500 illustrated in FIG. 5A. At step 1020, the electronic controller 230 determines a first geographic route from the initial location to destination location. Step 1020 is at least similar to step 507 of method 500 illustrated in FIG. 5A. At step 1025, the electronic controller 230 displays the transportation information when the transport container 110 is located at the initial location. At step 1030, the electronic controller 230 deploys the transport container 110 from the initial location along the first geographic route. At step 1035, the electronic controller 230 receives a rerouting signal including transportation information. At step 1040, the electronic controller 230 identifies a rerouting initial location in a rerouting destination location based on the transportation information received in the rerouting signal. At step 1045, the electronic controller 230 determines a second geographic route from the rerouting initial location to the rerouting destination location. At step 1050, electronic controller 230 displays the transportation information from the rerouting signal when the transport container 110 is located at the rerouting initial location. At step 1055, the electronic controller 230 deploys the transport container 110 from the rerouting initial location along the second geographic route. At step 1060, the transport container 110 reaches the rerouting destination location.

Figure 11:
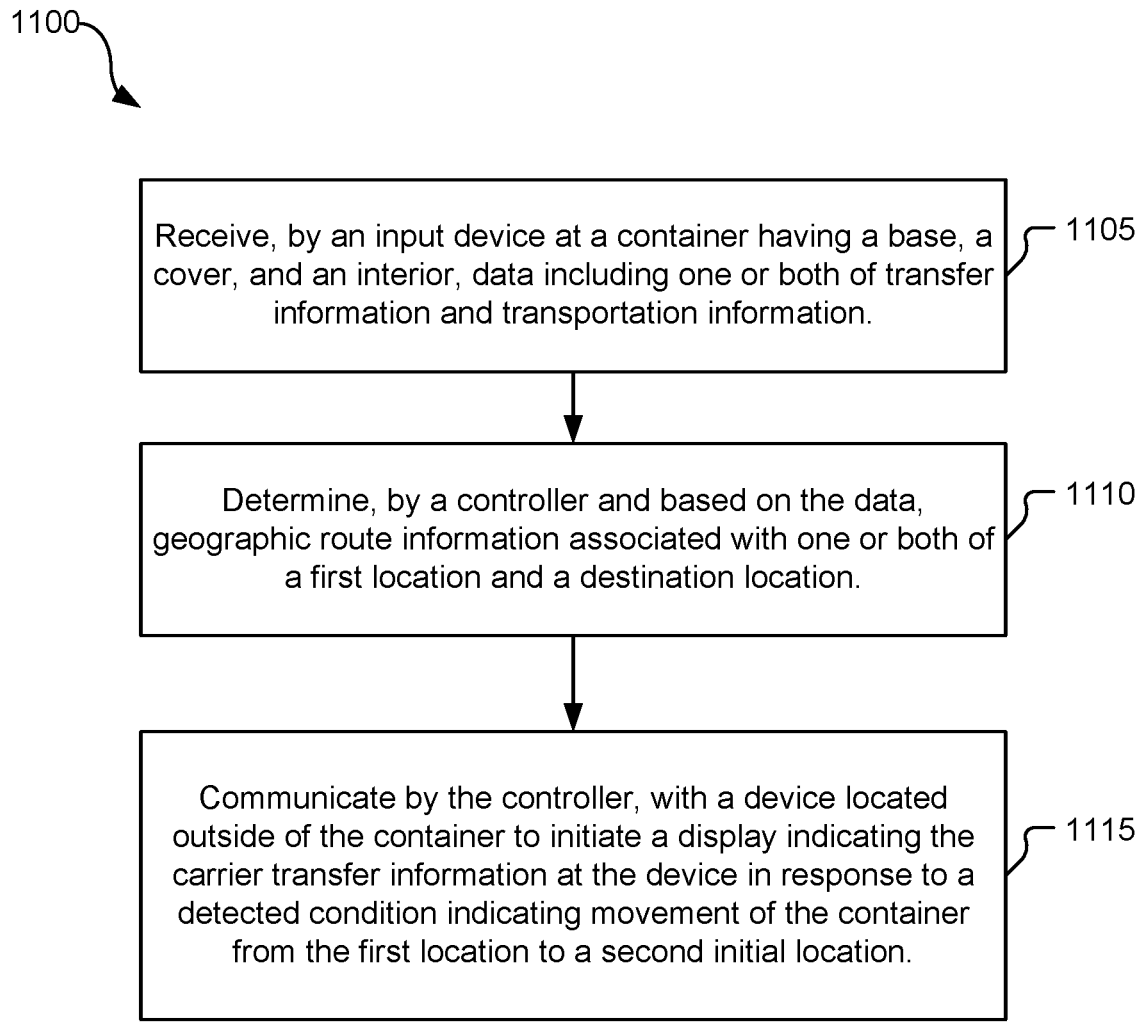
FIG. 11 illustrates a method of displaying data associated with transfer information and transportation information associated with a container according to certain embodiments of this disclosure.

FIG. 11 illustrates a method 1100 of displaying data associated with transfer information and transportation information associated with a container (e.g., a transport container 110) according to certain embodiments of this disclosure. Although certain details are provided with reference to the method 1110 of FIG. 11, it should be understood that other embodiments may include more, less, or different method steps. At 1105, an input device at a container having a base, a cover, and an interior receives data including one or both of transfer information and transportation information. At 1110, a controller (e.g., an electronic controller 230 of the transport container 110) determines, based on the data, geographic route information associated with one or both of a first location and a destination location. In response to a detected condition indicating movement of the container from the first location to a second location, the controller at 1115 communicates with a device located outside of the container to initiate a display indicating the transfer information at the device. In an example, the device includes a display screen attached to an external surface of the container, the condition indicates that the container is located at a carrier location, and the controller is configured to, prior to the communicating, deploy or instigate deployment of the container and detect the condition. In an example, the controller is configured to, after deployment of the container, receive carrier transfer information and particular transportation information via a rerouting signal, determine a particular geographic route from a carrier location to the destination location based on the carrier transfer information and the particular transportation information, and communicate the carrier transfer information to the device (e.g., for display) in response to a detected location of the container indicating the carrier location.

In some examples, the controller is configured to, after deployment of the container, perform one or more of wirelessly receive carrier transfer information and particular transportation information via a rerouting signal, determine a particular geographic route from a carrier location to the destination location based on the carrier transfer information and the particular transportation information, and communicate the carrier transfer information to the device in response to a detected location of the container indicating the carrier location. In certain examples, the controller is configured to perform one or more of determine a current location of the container after the container has been deployed from a carrier initial location, wirelessly transmit an indication of the current location to an electronic device, determine an estimated arrival time of the container at a carrier destination location in response to the container being located at a carrier initial location, or wirelessly transmit an indication of the estimated arrival time of the container to an electronic device.

Figure 12:
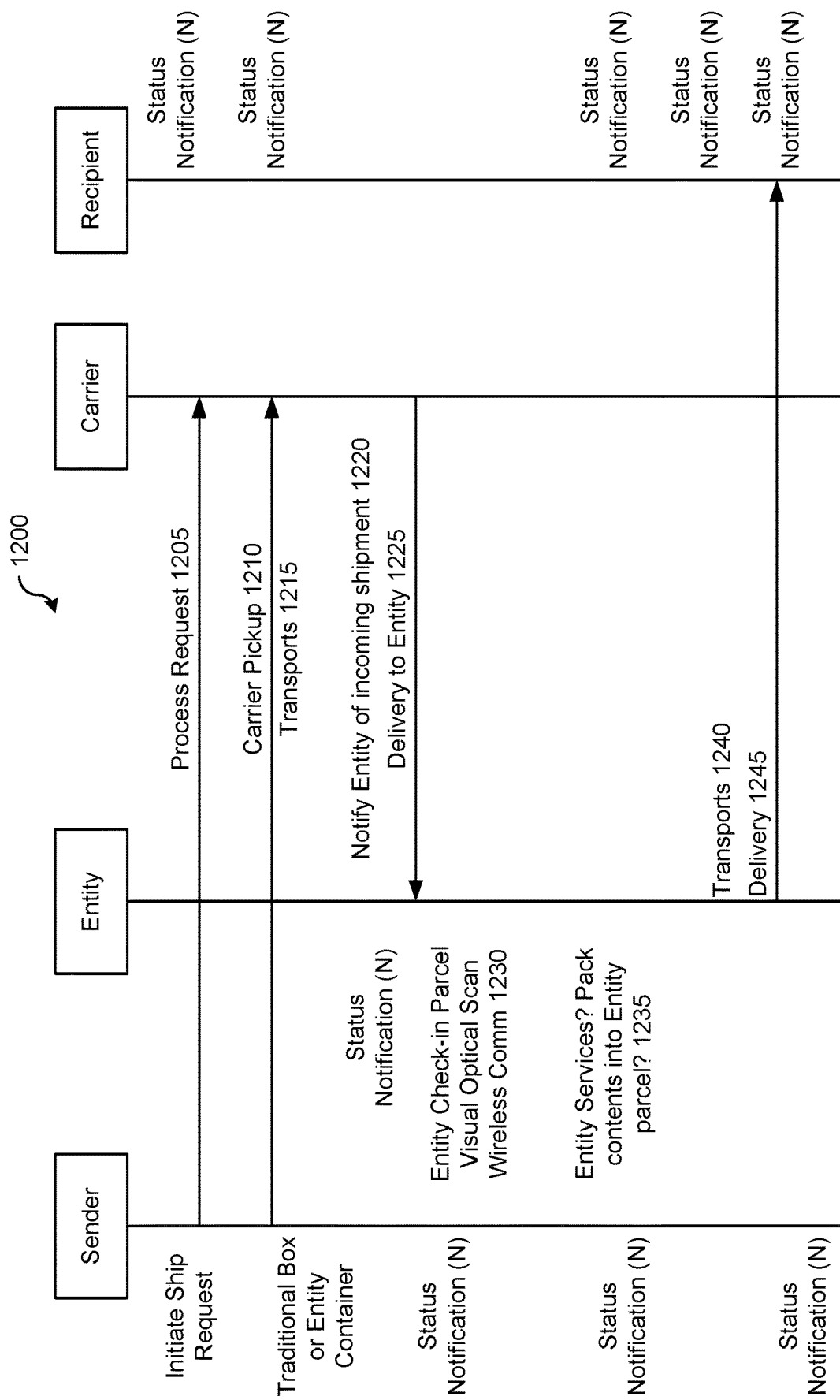
FIG. 12 illustrates a method of performing operations associated with providing a container interface (e.g., displaying data) according to certain embodiments of this disclosure.

FIG. 12 illustrates a method 1200 of performing operations associated with providing a container interface (e.g., to display data) according to certain embodiments of this disclosure. Although certain details are provided with reference to the method 1200, it should be understood that other embodiments may include more, less, or different method steps. At 1205, a carrier processes a request initiated by a sender. At 1210, the carrier picks up a container provided by the sender. The container may include a traditional or conventional box or may include an entity container. A recipient may receive a notification indicating one or both of the ship request and the carrier pickup. Following transport of the container by the carrier, at 1215, the carrier notifies a services entity of an incoming shipment at 1220 and delivers the container to the entity at 1225. One or both of the sender and the recipient may receive a notification indicating the delivery of the container to the entity. At 1230, the entity performs check-in processing of the package which may include one or more of visual identification of container label information, optical scanning of the container label information, and wireless communication (e.g., with a mobile device) of data associated with the container label information. One or both of the sender and the recipient may receive a notification indicative of the check-in processing. Entity services may be performed, at 1235, such as packing or repackaging the container or contents of the container into an entity parcel. The entity subsequently transports, at 1240, and delivers, at 1245, the container and/or parcel to the recipient. One or both of the sender and the recipient may receive a notification indicating the delivery of the container to the recipient.

Figure 13:
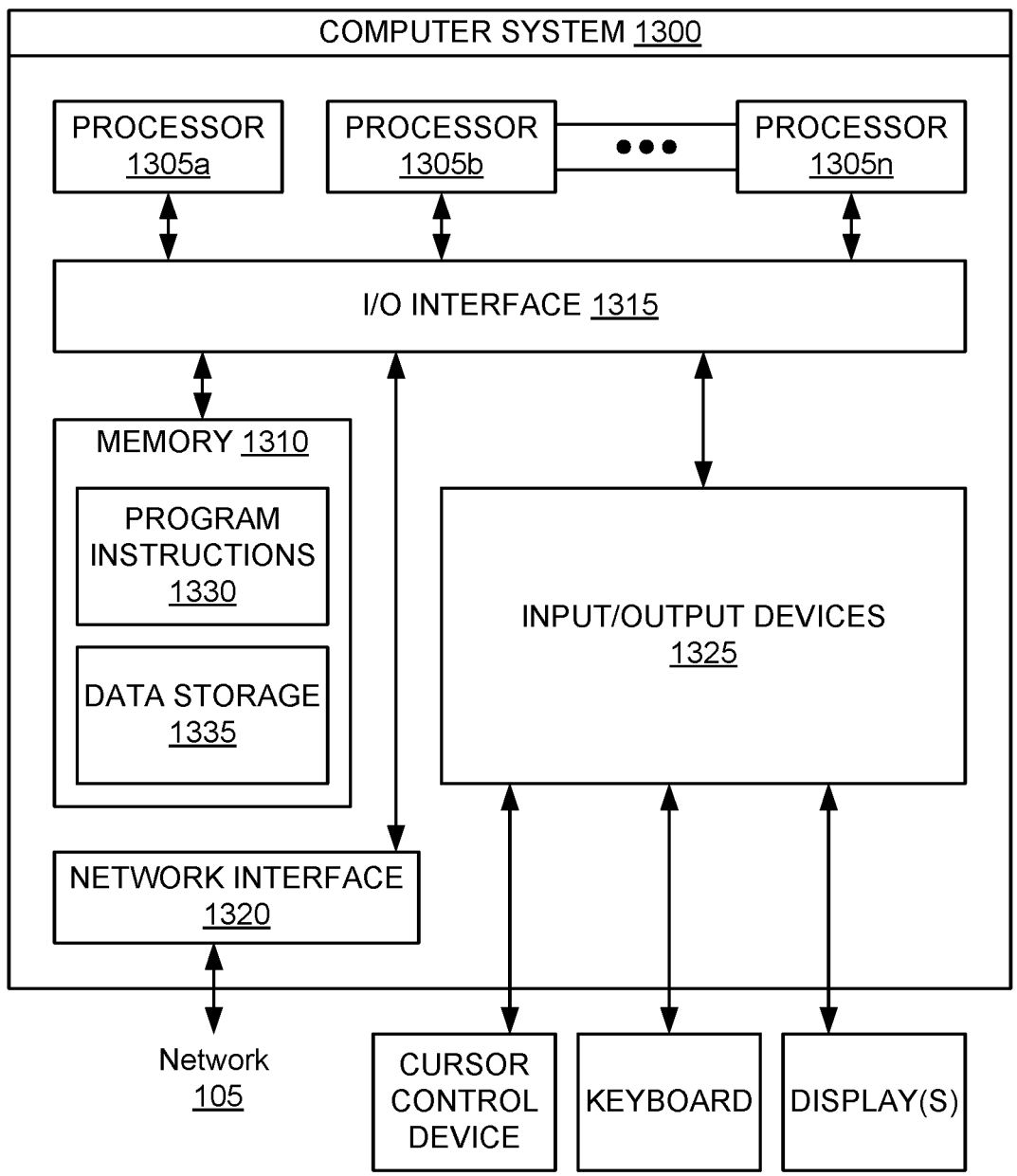
FIG. 13 illustrates a non-limiting, example computer system configured to implement aspects of systems and methods according to certain embodiments of this disclosure.

FIG. 13 illustrates a non-limiting, example of a computer system 1300 that is configured or configurable to implement systems and methods for performing carrier interface operations and transport container rerouting operations according to certain embodiments of this disclosure. FIG. 13 illustrates a computer system 1300 that is configured to execute any and all of the embodiments described herein. In certain embodiments, the computer system 1300 describes at least some of the components of the electronic device 115 illustrated in FIG. 1. In certain embodiments, the computer system 1300 describes at least some of the components of the server 125 illustrated in FIG. 1. In certain embodiments, the computer system 1300 describes at least some of the components of the electronic controller 230 illustrated in FIGS. 2 and 3. In different embodiments, the computer system 1300 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device (e.g., electronic controller 230 of a transport container, a handset, or the like), an application server, a storage device, a television, a peripheral device such as a switch, modem, router, or in general any type of computing or electronic device.

Various embodiments of a system and method for performing carrier interface operations and transport container rerouting operations, as described herein, may be executed on one or more computer systems (such a computer system 1300), which may interact with various other devices. In the illustrated embodiment, the computer system 1300 includes one or more processors 1305 coupled to a system memory 1310 via an input/output (I/O) interface 1315. The computer system 1300 further includes a network interface 1320 coupled to I/O interface 1315, and one or more input/output devices 1325, such as cursor control device, keyboard, and display(s). In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1305$a$, or a multiprocessor system including several processors 1305$a$-1305$n$ (e.g., two, four, eight, or another suitable number). The processors 1305 may be any suitable processor capable of executing instructions. For example, in various embodiments the processors 1305 may be general-purpose or embedded processors implementing any of a variety of instruction set architectures (ISAs), such as the x86, PowerPC, SPARC, or MIPS ISAs, or any other suitable ISA. In multiprocessor systems, each of processors 1205 may commonly, but not necessarily, implement the same ISA.

The system memory 1310 may be configured to store the program instructions 1330 and/or existing state information and ownership transition condition data in the data storage 1335 accessible by the processor 1305. In various embodiments, the system memory 1310 may be implemented using any suitable memory technology, such as static random access memory (SRAM), synchronous dynamic RAM (SDRAM), nonvolatile/Flash-type memory, or any other type of memory. In the illustrated embodiment, the program instructions 1330 may be configured to implement a system for package delivery incorporating any of the functionality, as described herein. In some embodiments, program instructions and/or data may be received, sent, or stored upon different types of computer-accessible media or on similar media separate from the system memory 1310 or the computer system 1300. The computer system 1300 is described as implementing at least some of the functionality of functional blocks of previous figures.

In one embodiment, the I/O interface 1315 may be configured to coordinate I/O traffic between the processor 1305, the system memory 1310, and any peripheral devices in the device, including the network interface 1320 or other peripheral interfaces, such as the input/output devices 1325. In some embodiments, the I/O interface 1315 may perform any necessary protocol, timing or other data transformations to convert data signals from one component (e.g., the system memory 1310) into a format suitable for use by another component (e.g., the processor 1305). In some embodiments, the I/O interface 1315 may include support for devices attached through various types of peripheral buses, such as a variant of the Peripheral Component Interconnect (PCI) bus standard or the Universal Serial Bus (USB) standard, for example. In some embodiments, the function of the I/O interface 1315 may be split into two or more separate components, such as a north bridge and a south bridge, for example. Also, in some embodiments some or all of the functionality of the I/O interface 1315, such as an interface to the system memory 1310, may be incorporated directly into the processor 1305.

The network interface 1320 may be configured to allow data to be exchanged between the computer system 1300 and other devices attached to the network 105 (e.g., carrier or agent devices) or between nodes of the computer system 1300. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 1320 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 1325 may, in some embodiments, include one or more display terminals, keyboards, keypads, touchpads, scanning devices, voice, or optical recognition devices, or any other devices suitable for entering or accessing data by one or more the computer systems 1300. Further, various other sensors may be included in the I/O devices 1325, such as imaging sensors, barometers, altimeters, LIDAR, or any suitable environmental sensor. Multiple input/output devices 1325 may be present in the computer system 1300 or may be distributed on various nodes of the computer system 1300. In some embodiments, similar input/output devices may be separate from the computer system 1300 and may interact with one or more nodes of the computer system 1300 through a wired or wireless connection, such as over the network interface 1320.

As shown in FIG. 13, the memory 1310 may include program instructions 1330, which may be processor-executable to implement any element or action, as described herein. In one embodiment, the program instructions may implement at least a portion of methods described herein, such as the methods illustrated by FIGS. 5A-10. In other embodiments, different elements and data may be included. Note that the data storage 1335 may include any data or information, as described herein.

Those skilled in the art will appreciate that the computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. Those skilled in the art will appreciate that any component or functionality, or any portion thereof, described or referenced herein may be included, coupled, used, adapted, made compatible, or otherwise incorporated, individually or in any combination or permutation, with any container, structure, parcel, package, or process.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computer system 1300 may be transmitted to the computer system 1300 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. A "non-transitory" computer readable medium excludes wired, wireless, optical, or other communication links that transport transitory electrical or other signals. A non-transitory computer readable medium includes media where data can be permanently stored (such as any computer memory device) and media where data can be stored and later overwritten, such as a rewritable optical disc or an erasable memory device. In some embodiments, a computer-accessible medium may include transmission media or signals such as electrical, electromagnetic, or digital signals, conveyed via a communication medium such as network and/or a wireless link.

Thus, the disclosure provides, among other things, a system for package delivery, including a carrier interface system and transport container rerouting system. Various features and advantages of the disclosure are set forth in the following claims.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus, comprising:
  a container comprising:
    a base;
    a cover;
    a lock adjustable between a first locked state and a first unlocked state, the lock configured to engage the cover while in the first locked state to prevent the cover from transitioning to an open state;
    a first locking bar coupled to a first end of the base;
    a second locking bar coupled to a second end of the base opposite the first end, wherein each of the first locking bar and the second locking bar is configured for attachment to anchor points, and wherein each of the first locking bar and the second locking bars is adjustable between a second locked state and a second unlocked state; and
    a controller disposed within the base, the controller electrically coupled to the lock and to the first and second locking bars, the controller configured to adjust the lock between the first locked state and the first unlocked state, and to adjust the first and second locking bars between the second locked state and the second unlocked state; and
  an input device coupled to the container and configured to receive data including one or both of transfer information and transportation information, wherein the controller is further configured to:

determine, based on the data, geographic route information associated with one or both of a first location and a destination location; and communicate with a device located outside of the container to initiate a display that indicates the transfer information at the device in response to a detected condition indicating movement of the container from the first location to a second location.

2. The apparatus of claim 1, wherein the container comprises a carrier container, wherein the device comprises a carrier device, wherein the condition indicates that the carrier container is located at a carrier location, wherein the carrier device includes a display screen attached to an external surface of the carrier container, and wherein the controller is further configured to, prior to the communicating, deploy or instigate deployment of the carrier container and detect the condition.

3. The apparatus of claim 1, wherein the device comprises a carrier input device, and wherein the controller is further configured to, after deployment of the container:
receive carrier transfer information and particular transportation information via a rerouting signal;
determine a particular geographic route from a carrier location to the destination location based on the carrier transfer information and the particular transportation information; and
communicate the carrier transfer information to the carrier input device in response to a detected location of the container indicating the carrier location.

4. The apparatus of claim 1, wherein the controller is further configured to receive the transfer information from an electronic device wirelessly via a transceiver.

5. The apparatus of claim 1, wherein the geographic route information indicates a geographic route, and wherein: if a carrier destination location is a different location than the destination location, the controller is further configured to deploy or instigate deployment of the container from the carrier destination location along the geographic route toward the destination location.

6. The apparatus of claim 1, wherein the device includes a wireless user device distinct from the container.

7. The apparatus of claim 1, wherein:
the geographic route information indicates a first geographic route from a carrier destination location to the destination location, and
the controller is further configured to determine a second geographic route from the first location to a carrier initial location in response to receipt of carrier transfer information.

8. The apparatus of claim 1, wherein the controller is further configured to:
determine a current location of the container after the container has been deployed from a carrier initial location; and
wirelessly transmit an indication of the current location to an electronic device external to or detached from the container.

9. The apparatus of claim 1, wherein the controller is further configured to:
determine an estimated arrival time of the container at a carrier destination location in response to the container being located at a carrier initial location; and wirelessly transmit an indication of the estimated arrival time of the container to an electronic device.

10. A method comprising:
receiving, by an input device at a container having a controller, a base, a cover, and an interior, data including one or both of transfer information and transportation information;
determining, by the controller and based on the data, geographic route information associated with one or both of a first location and a destination location; and
communicating, by the controller, with a device located outside of the container to initiate a display indicating the transfer information at the device in response to a detected condition indicating movement of the container from the first location to a second location; and
after the container has been deployed from the first location:
receiving, by the controller, carrier transfer information and particular transportation information via a rerouting signal;
determining, by the controller, based on the rerouting signal, a particular geographic route from a carrier destination location to the destination location based on the carrier transfer information and the particular transportation information; and
communicating, by the controller, the carrier transfer information to the device in response to a detected location of the container indicating a carrier initial location.

11. The method of claim 10, wherein the device includes a display screen attached to an external surface of the container, and further comprising deploying or instigating deployment of the container by the controller prior to the communicating with the device located outside of the container to initiate the display screen indicating the transfer information at the device in response to the detected condition indicating movement of the container from the first location to the second location.

12. The method of claim 10, further comprising determining, by the controller, a particular geographic route from the first location to the carrier initial location in response to receiving the carrier transfer information.

13. The method of claim 10, wherein the method further comprises:
determining, by the controller, an estimated arrival time of the container at the carrier destination location in response to the container being located at the carrier initial location; and
wirelessly transmitting, by the controller, an indication of the estimated arrival time of the container to an electronic device.

14. A device storing instructions that, when executed, cause a processor to perform operations comprising:
receiving, by an input device at a container having a controller, a base, a cover, and an interior, data including one or both of transfer information and transportation information;
determining, based on the data, geographic route information associated with one or both of a first location and a destination location; and
communicating with a device located outside of the container to initiate a display indicating the transfer information at the device in response to a detected condition indicating movement of the container from the first location to a second location; and
after the container has been deployed from the first location:
receiving, by the controller, carrier transfer information and particular transportation information via a rerouting signal;

determining, by the controller, a particular geographic route from a carrier destination location to the destination location based on the carrier transfer information and the particular transportation information; and communicating, by the controller, the carrier transfer information tothe device in response to a detected location of the container indicating a carrier initial location.

15. The device of claim 14, wherein the device includes a display screen attached to an external surface of the container, and wherein the operations further comprise deploying or instigating deployment of the container prior to the communicating with the device located outside of the container to initiate the display screen indicating the transfer information at the device in response to the detected condition indicating movement of the container from the first location to the second location.

16. The device of claim 14, wherein:
the geographic route information indicates a first geographic route from the carrier destination location to the destination location, and
the operations further comprise determining a second geographic route from the first location to the carrier initial location in response to receiving the carrier transfer information.

* * * * *

UNITED STATES PATENT AND TRADEMARK OFFICE
CERTIFICATE OF CORRECTION

| | | |
|---|---|---|
| PATENT NO. | : 12,060,210 B2 | |
| APPLICATION NO. | : 16/373541 | |
| DATED | : August 13, 2024 | |
| INVENTOR(S) | : David Brian Ruth and Yuan-Chang Lo | |

It is certified that error appears in the above-identified patent and that said Letters Patent is hereby corrected as shown below:

On the Title Page

Item (72) Change the 2nd named inventor, Yuan-Chang Lo's city of residence, from:
"Austin, TX"

To read:
--Snoqualmie, WA--.

In the Claims

Claim 14, Column 57, Line 7, change:
"tothe"

To read:
--to the--.

Signed and Sealed this
First Day of October, 2024

Katherine Kelly Vidal
*Director of the United States Patent and Trademark Office*